US012739524B2

(12) United States Patent
Murhed

(10) Patent No.: US 12,739,524 B2
(45) Date of Patent: Sep. 15, 2026

(54) METHOD AND ARRANGEMENTS FOR OBTAINING AND ASSOCIATING MULTISPECTRAL 2D IMAGE DATA WITH 3D IMAGE DATA FROM LIGHT TRIANGULATION

(71) Applicant: SICK IVP AB, Linköping (SE)

(72) Inventor: Anders Murhed, Linköping (SE)

(73) Assignee: SICK IVP AB, Linköping (SE)

( * ) Notice: Subject to any disclaimer, the term of this patent is extended or adjusted under 35 U.S.C. 154(b) by 0 days.

(21) Appl. No.: 18/677,170

(22) Filed: May 29, 2024

(65) Prior Publication Data

US 2025/0047986 A1 Feb. 6, 2025

(30) Foreign Application Priority Data

Jul. 31, 2023 (EP) .................................... 23188738

(51) Int. Cl.

| | |
|---|---|
| ***H04N 23/95*** | (2023.01) |
| ***H04N 23/10*** | (2023.01) |
| ***H04N 23/56*** | (2023.01) |

(52) U.S. Cl.

CPC ............. *H04N 23/95* (2023.01); *H04N 23/10* (2023.01); *H04N 23/56* (2023.01)

(58) Field of Classification Search

CPC ........ H04N 23/95; H04N 23/10; H04N 23/56; H04N 13/254; G06T 7/55; G01B 11/2518; G01B 11/00; G01B 11/0608; G01N 21/84; G01N 21/01; G01N 21/88; G01N 2021/8466

See application file for complete search history.

(56) References Cited

U.S. PATENT DOCUMENTS

| | | | | |
|---|---|---|---|---|
| 6,522,777 | B1 | 2/2003 | Paulsen | |
| 6,556,307 | B1 * | 4/2003 | Norita | G01B 11/2518 702/159 |
| 9,729,856 | B2 * | 8/2017 | Jang | H04N 13/254 |
| 2003/0133129 | A1 | 7/2003 | Yagi | |
| 2014/0168382 | A1 * | 6/2014 | Jang | G01B 11/2509 348/46 |

(Continued)

FOREIGN PATENT DOCUMENTS

| | | |
|---|---|---|
| JP | 2012251893 | 12/2012 |

*Primary Examiner* — Chiawei Chen

(74) *Attorney, Agent, or Firm* — DUANE MORRIS LLP; Gregory M. Lefkowitz; Brandon A. Chan

(57) ABSTRACT

Methods and arrangements for associating multispectral 2D image data with 3D image data from light triangulation performed by an imaging system for 3D imaging of an object are provided. The imaging system has second light sources for illuminating the object with multispectral second lights. Image data is obtained as first sensor positions, "SP1s", of first images IM1s that correspond intensity peaks of reflected first light from light triangulation of the object. Second images, "IM2s", are obtained and are imaging the object during illumination by the second lights, respectively. In an IM2, in relation to an SP1, a second sensor position, "SP2" is selected. Intensity values of SP2s are associated with the SP1s they were selected for, whereby multispectral 2D data corresponding to the intensity values in the SP2s from the reflected multispectral second lights become associated with the 3D data corresponding to the SP1s that the SP2s were selected for.

13 Claims, 14 Drawing Sheets

(56) References Cited

U.S. PATENT DOCUMENTS

| | | | | |
|---|---|---|---|---|
| 2017/0118455 | A1* | 4/2017 | Cho | G01S 7/4814 |
| 2019/0026877 | A1 | 1/2019 | Doge | |
| 2019/0253695 | A1* | 8/2019 | Festa | H04N 13/246 |
| 2021/0048341 | A1 | 2/2021 | Johannesson | |
| 2021/0067762 | A1* | 3/2021 | Du | G01B 11/2441 |
| 2023/0247186 | A1* | 8/2023 | Murhed | H04N 13/254<br>348/46 |
| 2025/0117900 | A1* | 4/2025 | Ichiki | G06T 7/593 |

* cited by examiner

Start

601 Obtain 3D data as first sensor positions (SP1) of first images (IM1) corresponding to locations of intensity peaks of reflected first light from object according to light triangulation 602 Obtain two or more second images (IM2) during illumination by two or more second lights, respectively, that are multispectral by comprising different light wavelengths 603 Select in respective IM2, for and in relation to respective SP1 of associated respective IM1, a respective second sensor position (SP2) where reflected second light has higher intensity than reflected first light 604 Associate intensity value of selected respective SP2 with the respective SP1 it was selected for, whereby multispectral 2D data corresponding to intensity values in SP2s from the reflected multispectral second lights become associated with the 3D data 605 Provide the 3D image data and 2D image data in same resolution 606 Combine 3D image data and the 2D image of same resolution into a combined image whereby respective 3D image data point becomes associated with multispectral 2D data End

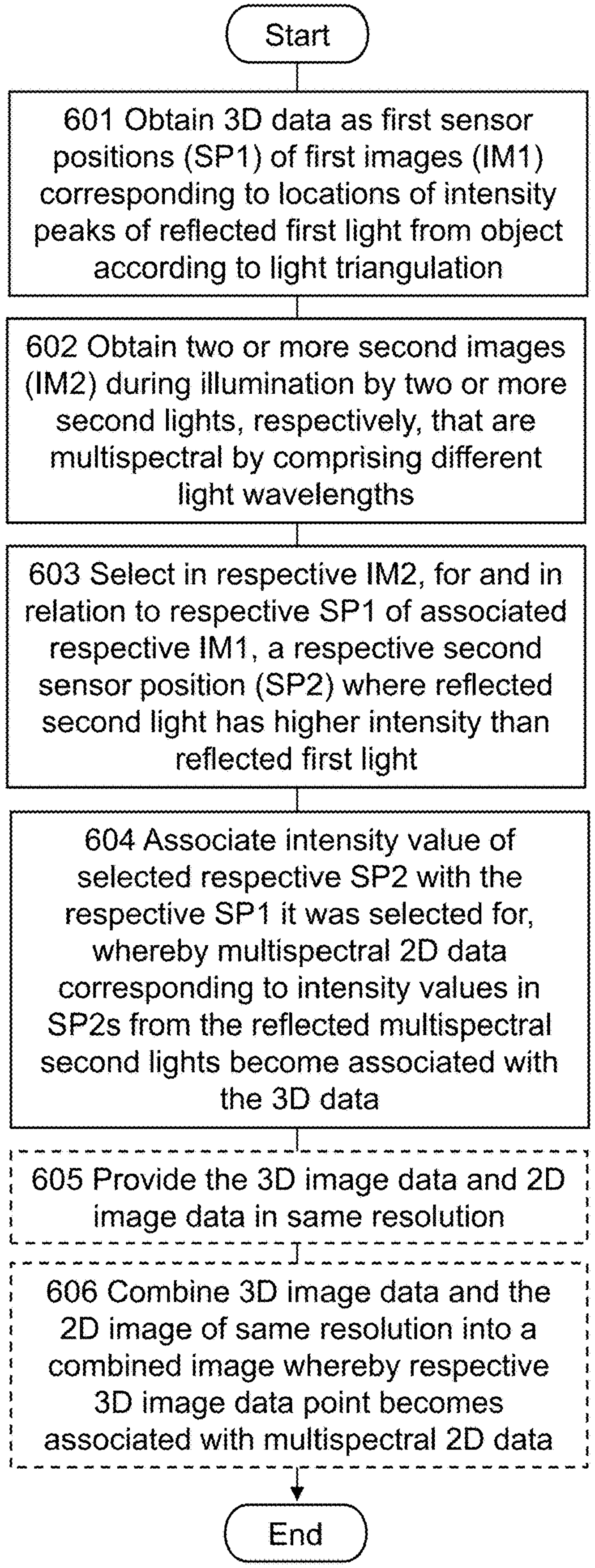

FIG. 6

METHOD AND ARRANGEMENTS FOR OBTAINING AND ASSOCIATING MULTISPECTRAL 2D IMAGE DATA WITH 3D IMAGE DATA FROM LIGHT TRIANGULATION

TECHNICAL FIELD

Embodiments herein concern a method and arrangements for obtaining and associating multispectral 2D image data with 3D image data from light triangulation.

BACKGROUND

Industrial vision cameras and systems for factory and logistic automation are often based on three-dimensional (3D) machine vision, where 3D-images of a scene and/or object are captured. By 3D-images is referred to images that comprise also "height", or "depth", information and not, or at least not only, information, e.g. intensity and/or color, regarding pixels in only two-dimensions (2D) as in a conventional image. That is, each pixel of the image may comprise such information associated with the position of the pixel in the image and that maps to a position of what has been imaged, e.g. the object. Processing may then be applied to extract information on characteristics of the object from the 3D images, i.e. 3D-characteristics of the object, and e.g. convert to various 3D image formats. Such information on height may be referred to as range data, where range data thus may correspond to data from height measurement of the object being imaged, or in other words from range or distance measurements of the object. Alternatively or additionally the pixel may comprise information on e.g. material properties such as relating to the scattering of the light in the imaged area or the reflection of a specific wavelength of light.

Hence, a pixel value may e.g. relate to intensity of the pixel and/or to range data and/or to material properties.

Line scan image data results when image data of an image is scanned or provided one line at a time, e.g. by camera with a sensor configured to sense and provide image data, one line of pixels at a time.

A special case of line scan image is image data provided by so called "sheet of light" or light plane, triangulation. Laser is often preferred but also other light sources can be used, e.g. light sources able to provide light that stays focused and do not spread out to much, that is, light that is "structured", for example light provided by a laser or Light Emitting Diode (LED).

3D machine vision systems are often based on such light triangulation. In such a system there is a light source illuminating the object with structured light corresponding to a specific light pattern, such as a light plane that results in a light, or laser, line on the object and along which line 3D characteristics of the object are captured, corresponding to a profile of the object. By scanning the object with such a line, i.e. performing a line scan, involving movement of the line and/or object, 3D characteristics of the whole object can be captured, corresponding to multiple profiles.

3D machine vision systems or devices based on light triangulation and for example uses a sheet of light for the light triangulation may be referred to as systems or devices for 3D imaging based on light, or sheet of light, triangulation, or simply laser triangulation when laser light is used.

Typically, to produce a 3D-image based on light triangulation, reflected light from an object to be imaged is captured by an image sensor of a camera and intensity peaks are detected in the image data. The peaks occur at positions corresponding to locations on the imaged object with the incident light, e.g. corresponding to a laser line, that was reflected from the object. The position in the image of a detected peak will map to a position on the object from where the light resulting in the peak was reflected.

A light or laser triangulating system, i.e. a 3D imaging system based on light triangulation, typically projects a light or laser line onto an object to create height curves from the surface of the object. By moving the object relative to the cameras and light sources involved, information on height curves from different parts of the object can be captured by images and then combined and used with knowledge of relevant geometries of the system to produce a three dimensional representation of the object, i.e. 3D image data is provided. This technique may be described as grabbing of images of the light, typically a laser line, when it is projected onto and reflected by the object and then, in the images, extract positions of the reflected light line. This is normally accomplished by identifying positions of intensity peaks in image frames e.g. using a conventional peak finding algorithm. Typically but not necessary the imaging system is setup so that intensity peaks can be searched for per column of the sensor and the position within the column maps to a height or depth.

In many applications it is desirable to not only get 3D image data, such as height and dept of an object, but also conventional 2D image data of the object, e.g. in order to provide a texture to a 3D model of the object formed from the 3D image data so that the model can be made to look and/or be an even better representation of the real world object. Additionally or alternatively it is of interest to get certain 2D information from the surface of the object, for example for quality assurance reasons. It may be of particular interest to get such information for the same positions as the 3D image data, i.e. so the 2D image data is for and/or aligned with 3D positions that correspond to actual position on the object that both the 3D image data and 2D image data was captured from. In the light triangulation case it is thus of interest to get 2D image data associated with the intensity peak positions. With 2D image data associated with 3D image data positions it is for example possible to analyze a 2D image surface of a 3D model of an object to identify e.g. text, scratches, marks, and/or color variations etc., and be able to identify where on an actual object these are located, if they are also associated with height variations etc.

Greyscale 2D image data from reflectance and intensity can be obtained for example using the same light, e.g. laser, as used in the light triangulation to provide the 3D image data. However, in the laser case, often so-called speckle noise occurs then occur in the 2D image, due to the special properties of the laser light. Also, it can be realized that the 2D information that can be obtained this way from the surface of an object is quite limited.

SUMMARY

In view of the above, an object is to provide one or more improvements or alternatives to the prior art, such as providing an improved way of how 2D image data can be associated with 3D image data resulting from light triangulation.

According to a first aspect of embodiments herein, the object is achieved by a method for associating multispectral 2D image data with 3D image data generated from light triangulation performed by an imaging system for 3D imaging of an object. Said imaging system comprising a first light source for illuminating the object with first light, a camera with image sensor and one or more second light sources for illuminating the object with two or more second lights that are multispectral by differing from each other by comprising different light wavelengths. Said light triangulation comprises to illuminate consecutive portions of the object with the first light and sense reflected first light from respective portion by the image sensor in a respective first image (IM1).

The method comprises to obtain said 3D data as first sensor positions (SP1s) of IM1s generated by said camera and image sensor, where the SP1s correspond to locations of intensity peaks of reflected first light from the object as part of said light triangulation.

Further, the method comprises to obtain two or more second images (IM2s) generated by said camera and image sensor and imaging the object during illumination by said two or more second lights, respectively. Respective IM2 is either, and associated with, a respective IM1 of said IM1s, or generated between two of said IM1s and associated with any of them.

The method further comprises to select in respective IM2, for and in relation to respective SP1 of the respective IM1 that the respective IM2 is associated with, a respective second sensor position (SP2) where reflected second light from the object has higher intensity than the reflected first light from the object.

Moreover, the method comprises to associate intensity values of the selected SP2s with the SP1s they were selected for, respectively, whereby multispectral 2D data corresponding to the intensity values in the SP2s from the reflected multispectral second lights become associated with the 3D data corresponding to the SP1s that the SP2s were selected for.

According to a second aspect of embodiments herein, the object is achieved by one or more devices for associating multispectral 2D image data with 3D image data generated from light triangulation performed by an imaging system for 3D imaging of an object. Said imaging system comprising a first light source for illuminating the object with first light, a camera with image sensor and one or more second light sources for illuminating the object with two or more second lights that are multispectral by differing from each other by comprising different light wavelengths. Said light triangulation comprises to illuminate consecutive portions of the object with the first light and sense reflected first light from respective portion by the image sensor in a respective first image (IM1). Said one or more devices are configured to:

Obtain said 3D data as first sensor positions (SP1s) of IM1s generated by said camera and image sensor, where the SP1s correspond to locations of intensity peaks of reflected first light from the object as part of said light triangulation. Further, the method comprises to:

Obtain two or more second images (IM2s) generated by said camera and image sensor and imaging the object during illumination by said two or more second lights, respectively. Respective IM2 is either, and associated with, a respective IM1 of said IM1s, or generated between two of said IM1s and associated with any of them.

Select in respective IM2, for and in relation to respective SP1 of the respective IM1 that the respective IM2 is associated with, a respective second sensor position (SP2) where reflected second light from the object has higher intensity than the reflected first light from the object.

Associate intensity values of the selected SP2s with the SP1s they were selected for, respectively, so that multispectral 2D data corresponding to the intensity values in the SP2s from the reflected multispectral second lights become associated with the 3D data corresponding to the SP1s that the SP2s were selected for.

According to a third aspect of embodiments herein, the object is achieved by one or more computer programs comprising instructions that when executed by one or more processors causes said one or more devices according to the second aspect to perform the method according to the first aspect.

According to a fourth aspect of embodiments herein, the object is achieved by one or more carriers comprising the one or more computer programs according to the third aspect, wherein the one or more carriers are one or more of the following: electronic signal, optical signal, radio signal or computer readable storage medium.

Embodiments herein provide multispectral 2D image data associated with and aligned on a sensor position, or pixel, level with 3D image data from the light triangulation using one and the same camera that can be a conventional, typically monochrome, camera used in conventional 3D imaging based on light triangulation. Further, the 2D image data will also share focus with the 3D image data and when for example Scheimpflug is utilized by the imaging system to give focus where the illumination of the first light is present, typically in a light plane, and thus focus on the object where the 3D image data is generated, also the multispectral 2D image data will gain from this focus. This without being limited to obtain the 2D image data from illumination by only the first light used to obtain the 3D image data.

As a result, it is enabled 3D imaging of objects based on light triangulation with in focus and well aligned multispectral 2D image data, for example in the form of a texture, such as a full color, surface of a 3D object resulting from the 3D imaging. Further, great variety of 2D image data can be obtained from different combinations of second lights of several different wavelengths and/or using different kind of light sources and/or illumination, including illumination from different positions and directions.

The 2D image data is obtained from IM2s that may be the same image (IM1) that the associated 3D image data is obtained from. and/or the 2D image data may be from IM2s separate from IM1s but generated between IM1s so that the 2D image data thereby is relevant for and associated with the 3D image data. In the latter case the IM2s are generated in the time period between two consecutive IM1s with 3D image data from the light triangulation. Said embodiments with IM1=IM2 enable less data processing and facilitate implementation with existing systems, while said embodiments with IM2s separate from IM1s enable greater freedom in selecting SP2s and exposure period(s) to use for second light(s) and how illumination of the second light(s) can be provided in relation to the first light, such as laser, used by the light triangulation.

Also, embodiments herein enable improved detectability of object surface details, such as defects, thanks to the multispectral 2D image data in combination and alignment with the 3D image data from light triangulation.

BRIEF DESCRIPTION OF THE DRAWINGS

Examples of embodiments herein are described in more detail with reference to the appended schematic drawings, which are briefly described in the following.

FIG. 1 schematically illustrates an example of a prior art imaging system that also embodiments herein can use and/or be based on.

FIG. 6 is a flowchart for schematically illustrating a method according to embodiments herein.

DETAILED DESCRIPTION

Figure 1:
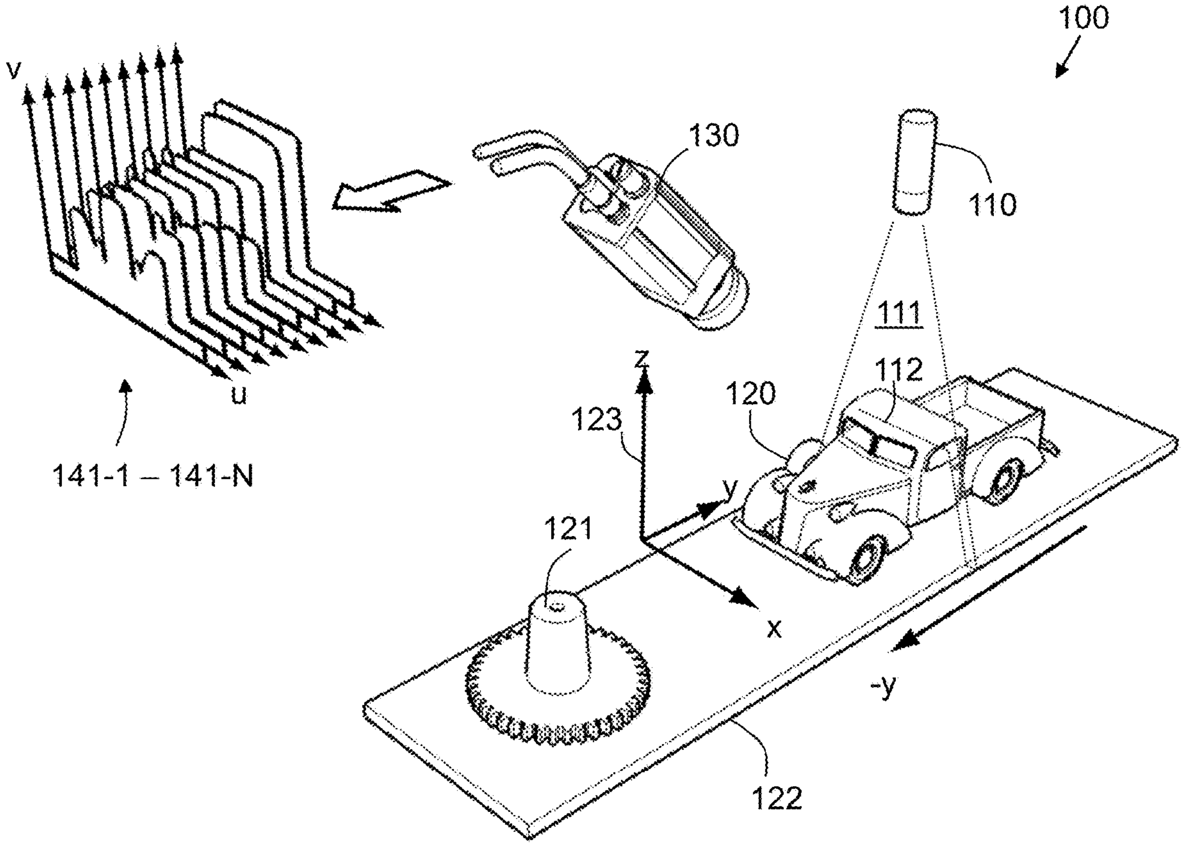

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

When the light triangulation light source, typically laser, is used for obtaining reflectance images, i.e. image with 2D image data of an object, disadvantages include speckle noise in the image and no possibility to gather alternate surface information than what is possible from the light used in the light triangulation.

On the other hand, if images of the object are obtained separate from the light triangulation, it is very difficult if at all possible in all application to get a desirable alignment with a 3D image of the measure object as resulting from the light triangulation.

A "multi scan" approach may be used where e.g. a separate row or rows of an imager, i.e. the image sensor used, can be used to gather 2D image data but this is still without any good alignment with the 3D image data. Furthermore, it is difficult to create good focus for both the light triangulation, that most of the imager is used for, and the separate 2D image data readout. A light triangulation setup will typically have maximum focus only around a light, typically laser, plane used for the light triangulation, which is accomplished using Scheimpflug focusing and the ability and desire to use a large aperture opening to allow more light to reach the imager.

It is desirable with a way to obtain 2D image data that is not limited to using the light used in the light triangulation as such and at the same time be able to get useful 2D image data and that is well aligned with 3D image data from the light triangulation.

An earlier application by the Applicant, EP22154020.6, is related to a solution regarding the above. The present application and embodiments herein are based on the solution of said earlier application but are specifically targeted to embodiments with multispectral 2D image data, that is, how further lights with different wavelengths can be used to produce 2D image data, for example full color image data, with associated 3D image data. Part of the information disclosed in said earlier application is repeated in the following to (re) introduce some basics and to facilitate understanding of embodiments herein. However, some reference numerals and naming have been changed to be better suitable to the context of the present application.

FIG. 1 schematically illustrates an example of a prior art imaging system 100 for 3D imaging based on light triangulation that embodiments herein may be based on. The imaging system 100 may alternatively for example be named an imaging system for 3D machine vision based on light triangulation for capturing information on 3D characteristics of objects. The imaging system 100 is in the figure shown in a situation of normal operation, that is, typically after calibration has been performed and the system is thus calibrated. The imaging system 100 is configured to perform light triangulation, here in the form of sheet of light triangulation, that is, light triangulation where the structured light being a light plane is used. The imaging system 100 further comprises a light source 110, such as a laser, for illumination of objects to be imaged with structured light, typically a specific light pattern. In the example and figure there is structured light 111 in the form of a light plane. The light may, but not need to be, laser light, it may alternatively for example be light from one or m more Light Emitting Diodes (LEDs). Another example of structured light that is similar to but not what conventionally is a light plane but with similar effect, is a light edge, that is, an edge of an area with illumination. The generated light and illumination is typically provided through one more lenses, for example in order to focus the light. Moreover, the camera is typically configured and located so that it, based on the so called Scheimpflug principle or Scheimpflug focusing, will have a focus plane co-located with, in other words, aligned, with the structured light 111, typically light plane. This way object reflections that occur in the light plane will be in focus in the image sensor. In the shown example, the objects subject to the imaging are exemplified by a first object 120 in the form of a car and a second object 121 in the form of a gear wheel construction. The objects that are imaged may be referred to as measure objects. When the structured light 111 is incident on an object, this corresponds to a projection of the structured light 111 on the object, which may be viewed upon as the structured light 111 intersects the object. For example, in the shown example, the structured light 111 in the form of the light plane results in a light line 112 on the first measure object 120. The structured light 111 is reflected by the object, more specifically by portions of the object at the intersection, that is, at the light line 112 in the shown example. The imaging system 100 further comprises a camera 130 comprising an image sensor (not shown in FIG. 1). The camera and image sensor are arranged in relation to the light source 110 and the objects to be imaged so that the structured light 111, when reflected by the objects, become incident on the image sensor. The image sensor is an arrangement, typically implemented as a chip, for converting incident light to image data. Said portions of the object, which by reflection causes said incident light on the image sensor, may thereby be captured by the camera 130 and the image sensor, and corresponding image data may be produced and provided for further use. For example, in the shown example, the structured light 111 will, at the light line 112 on a portion of the car roof of the first object 120, be reflected towards the camera 130 and image sensor, which thereby may produce and provide image data with information about said portion of the car roof. In accordance with the principle of light triangulation, with knowledge of the geometry of the imaging system 100, for example how image sensor coordinates relate to world coordinates, such as coordinates of a coordinate system 123, such as Cartesian coordinates, relevant for the object being imaged, the image data may be converted to information on 3D characteristics, for example in the form of a 3D shape or profile, of the object being imaged in a suitable format. The information on said 3D characteristics may comprise data describing 3D characteristics in any suitable format.

By moving the light source 110 and/or the object to be imaged, such as the first object 120 or the second object 121, so that multiple portions of the object are illuminated and cause reflected light sensed in images by the image sensor, in practice typically by scanning the objects with the structured light 111, image data describing a more complete 3D shape of respective object may be produced, for example corresponding to multiple, consecutive, profiles of respective object, such as the shown profile images 140-1-140-N of the first object 120. Each profile image shows a contour of the first object 120 where the structured light 111 was reflected when the image sensor of the camera unit 130 sensed the light resulting in the profile image. As indicated in the figure, a movable object support structure 122, such as a conveyor belt or similar, may be used to move, and thereby scan, objects through the structured light 111, with the light source 110 and the camera unit 130 typically stationary. Alternatively the structured light 111 may be moved over the object so that all portions of the object, or at least all portions facing the light source 110, are illuminated and the camera receives light reflected from all parts of the object desirable to image.

As understood from the above, respective image, corresponding to an image frame, provided by the camera 130 and its image sensor, for example during imaging of the first object 120, may correspond to, or be used to provide, any one of the profile images 140-1-140-N. Each position of the contour of the first object shown in any of the profile images 140-1-140-N are typically determined based on identification of intensity peaks in image data captured by the image sensor and on finding the positions of these intensity peaks. The imaging system 100 and conventional peak finding algorithms are typically configured to, in each image frame, search for an intensity peak per pixel column. If sensor coordinates are u, v and for example u, as indicted in the figure, corresponds to pixel positions along rows in the image sensor and v corresponds to pixel positions along columns, there is for each position u of an image frame searched for peak position along v and the identified peaks in an image frame may result in one such "clean" profile image as shown in the figure, and the total of image frames and profile images can be used to create a 3D image of the first object 120.

Figure 2A:
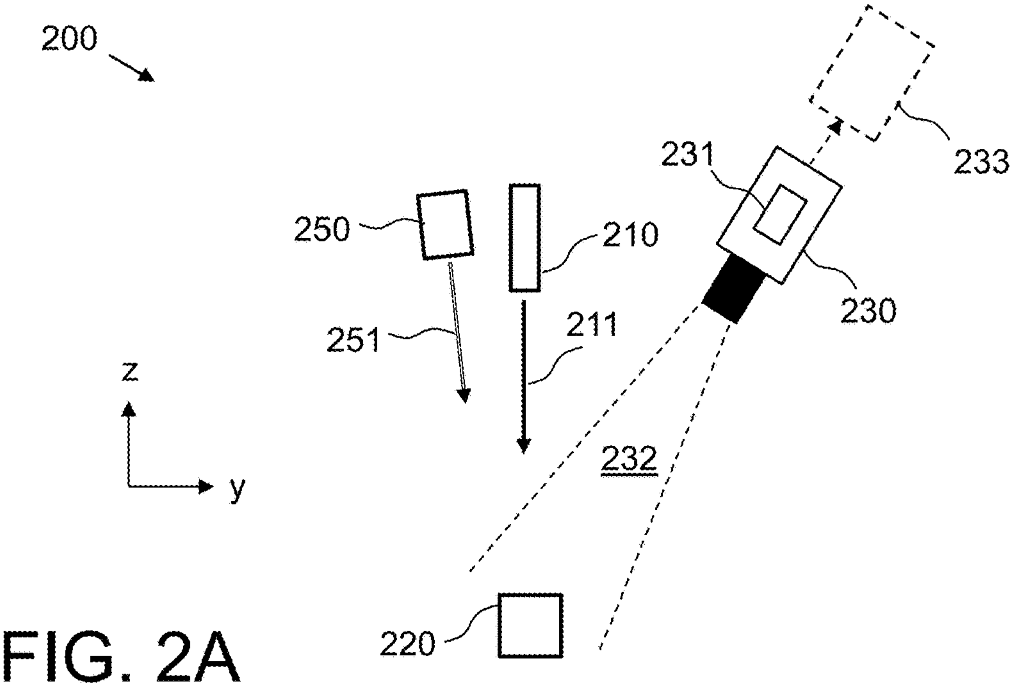
FIG. 2A schematically illustrates a simplified first example of a an imaging system that can be configured to carry out light triangulation and embodiments of an earlier application.

FIG. 2A schematically illustrates a simplified first example of a an imaging system 200 that can be configured to carry out light triangulation and embodiments of said earlier application. The imaging system 200 is based on light triangulation for capturing information on 2D and 3D characteristics of one or more objects that may be referred to as measure objects. The shown system corresponds to a basic configuration and comprises: A first light source 210 for illuminating said one or objects, here exemplified by object 220 in the figure, with first light 211, typically laser light, as part of light triangulation for 3D imaging of the measure object 220. A second light source 250 for illuminating the object 220 with second light 251 for 2D imaging of the measure object 220. A camera 230 with image sensor 231 arranged for sensing reflected first light from the object 220 as part of said light triangulation for the 3D imaging, and for sensing reflected second light from the object 220 for said 2D imaging.

The camera 230, image sensor 231 and first light source 210 are configured and positioned in relation to each other for light triangulation and may thus be such or be based on such used in conventional light triangulation. The system 200 may for the light triangulation purpose correspond to the system 100 in FIG. 1, i.e. regarding the first light source 210, the camera 230, the image sensor 231, how they are positioned in relation to each other and the measure object 220 etc., but additionally configured to perform as described below. The image sensor 231 should of course also be sensitive to the second light being used.

Hence: The object 220 may correspond to the first object 120 and is shown located at least partly within field of view 232 of the camera 230. The first light source 210 is configured to illuminate the measure object 220 with the first light 211 being light used for the light triangulation, thus typically structured light, such as a specific light pattern, for example a sheet of light or light plane, for example provided by a laser. The first light 211 is reflected by the object 220 and the reflected first light is captured by the camera 230 and image sensor 231 as part of the light triangulation. Another example of structured light that can be used as the first light is a light edge, i.e. an edge of an area or portion with illumination.

The object 220 may thus be illuminated and images may be captured as in conventional light triangulation. Said light triangulation as such may thus be as in the prior art and involve movement of the first light source 210 and/or the object 220 in relation to each other, so that at different consecutive time instants, different consecutive portions of the object 220 are illuminated by the first light source 210 and the first light 211, and the reflected first light 211 from the object 220 is sensed by the image sensor 231. As in conventional light triangulation, typically, but not necessary, the camera 230 and first light source 210 are fixed in relation to each other and the object 220 move in relation to these. Through said sensing by the image sensor 231, a respective image frame is associated with a respective time instant of when the image frame was sensed, i.e. captured, and with a respective portion of the measure object 220 from which the image sensor 231 sensed reflected first light 211 at the respective time instant.

The camera 230 may be a prior art camera, e.g. correspond to the camera 130 in the system 100 of FIG. 1 and the image sensor 231 may be the same or similar image sensor discussed above in relation to FIG. 1. Image frames and/or information derived from image frames provided by the camera 230 and the image sensor 231 may be desirable to transfer, e.g. transmit, for further processing outside the camera 330, e.g. to a computing device 233, such as a computer or similar. Such further processing may additionally or alternatively be performed by a separate computing unit or device (not shown), i.e. separate from the image processor 231, but still comprised in, e.g. integrated with, the camera 230, or a unit comprising the camera 230. The computing device 233, e.g. computer, or another device (not shown) may be configured to control devices involved in the light triangulation and/or involved in embodiments herein, so that the light triangulation and/or other actions relating to embodiments herein are performed.

As in conventional 3D imaging by light triangulation, the first light source 110 and the camera 230 are typically arranged at predetermined fixed positions and with known relations to each other for the light triangulation. Said imaging system 200 also comprises a second light source 250 that may also be at fix position in relation to the camera 230 and first light source 210 but exact position and relation to the camera 230 and image sensor 231 is not utilized as in light triangulation for embodiments herein and the second light source can thus be arranged more freely with the purpose to provide illumination by second light.

Figure 2B:
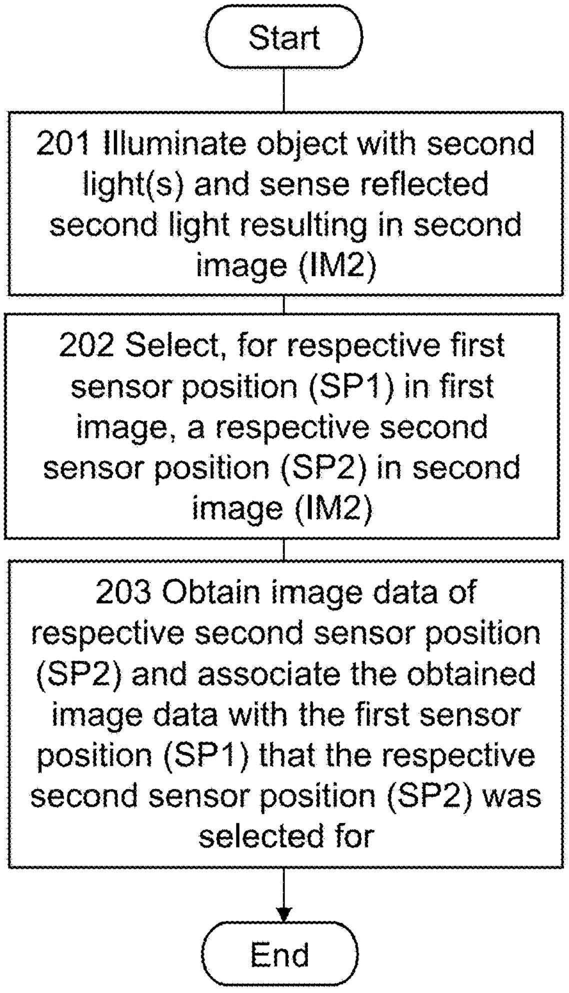
FIG. 2B is a flowchart for schematically illustrating a method disclosed in said earlier application.

FIG. 2B is a flowchart for schematically illustrating a method disclosed in said earlier application. The actions below, which may form the method, are for obtaining and associating 2D image data with 3D image data. The 3D image data being based on first intensity peak positions resulting from light triangulation performed by an imaging system, exemplified by the imaging system 200 in the following. The first intensity peak positions may thus be intensity peak positions as determined in conventional light triangulation. They are explained and exemplified in relation to embodiments herein further below and in separate drawings and examples. The imaging system that may perform the method thus comprises a first light source for illuminating an object with first light and an image sensor for sensing reflected first light from the object. In the following, the first light source and first light are exemplified by the first light source 210 and first light 211, and the object and the image sensor are exemplified by the object 220 and the image sensor 231.

As in conventional light triangulation, the light triangulation comprises:

To illuminate a first portion of the object 220 with the first light 211 and sense reflected first light from the first portion by the image sensor 231 during a first exposure period (EXP1-1) resulting in a first image (IM1-1) with first intensity peaks occurring at first sensor positions (SP1-1).

To illuminate another, second, portion of the object 220 adjacent to said first portion with the first light 211 and sense reflected first light from the second portion by the image sensor 231 during another first exposure period (EXP1-2) resulting in a further first image (IM1-2) with intensity peaks occurring at further first sensor positions (SP1-2).

The first images (IM1s) thus correspond to consecutive image frames, with first intensity peaks at SP1s and are part of the light triangulation.

Said exposure periods, images, sensor positions, SP1-1 and SP1-2, are explained and exemplified further below and in separate drawings and examples.

Moreover, the imaging system, such as the imaging system 200, further comprises one or more additional, second, light sources for illuminating the object 220, with one or more second lights different than said first light. In the following, the second light source(s) and second light(s) are exemplified by the second light source 250 and second light 251.

The method and/or actions below and indicated in FIG. 2B may be performed by device(s), i.e. one or more devices, such as the camera 230 and/or the computing device 233, or by the imaging system 205 and/or suitable device(s) thereof or connected to it.

Note that the actions below may be taken in any suitable order and/or be carried out fully or partly overlapping in time when this is possible and suitable.

Action 201

The object 220 is illuminated with said one or more second lights 251 and it is sensed reflected second light from the object 220 by the image sensor 231 during one or more second exposure periods (EXP2) resulting in one or more second images (IM2s), respectively.

The illumination should be provided so that during any first exposure period (EXP1), any reflected second light will result in lower intensity than intensity from reflected first light in the first sensor positions (SP1). This makes sure second light interference of the first light intensity peaks is low. This is further explained and exemplified below in relation to FIGS. 4A-C.

The images and exposure periods are explained and discussed below in relation to FIGS. 3A-B for two main groups, respectively.

Action 202

It is, for respective first sensor position (SP1) in the first image, selected a respective second sensor position (SP2) in said one or more second images (IM2). Said illumination with the one or more second lights 251 should be provided so that during said one or more second exposure periods (EXP2), any reflected second light from the object 220 will result in higher intensity than reflected first light 211 in the selected second sensor positions (SP2). This makes sure that the reflected second light is not obscured and/or is undesirably interfered by reflected first light in the second sensor positions (SP2). This can also, when needed, be accomplished by suitable selection of SP2s in relation to SP1s as explained below. See further explanations and examples below in relation to FIGS. 4A-C.

The second sensor positions (SP2) may be selected with a predefined or predetermined relation to the first sensor positions (SP1) resulting from the light triangulation. It may for example be predetermined that a respective SP2 shall be selected with a predefined or predetermined relation to a respective SP1, such as at a predefined or predetermined distance and/or in a predefined or predetermined direction from the respective SP1. In practice a suitable direction is typically the direction on the image sensor that maps to "height", typically along columns of the image sensor, that is, in the examples herein, along v in sensor coordinates that map to z in real world coordinates in the coordinate system used in the examples herein. More generally, the direction along which SP1s are searched for may be a sensor direction along which it is expected one intensity peak from the light triangulation and that corresponds to an object point where the first light was directly reflected by the object towards the camera. Since the light distribution in this direction is given by the structured first light, such as corresponding to a light, or laser, plane and how it projects as a line on the object, it is known, or can if needed easily be found out, how the light intensity decreases in this direction. Thereby it can be found a distance, for example in pixels, in advance, that can be used as predetermined distance, where the second light intensity will be higher than the first light intensity in the case both the first and second lights are captured in the same image, as in the case of the first main group mentioned below. The sensor positions SP, including selection of second sensor position SP2 and what differs between two main groups, are further explained and exemplified below in relation to FIGS. 4A-C.

Action 203

It is obtained 2D image data from respective second sensor position (SP2) in said one or more second images (IM2s), i.e. the second sensor positions as selected in Action 202, and the obtained image data is associated with the first sensor position (SP1) that the respective second sensor position (SP2) was selected for. As a result, since the 3D image data from the light triangulation is based on, or corresponds to, the first intensity peak positions in the first sensor positions (SP1), the obtained 2D image data becomes associated with the 3D image data.

As used herein, "2D image data" may refer to image data in positions or pixels of an image sensor, e.g. the image sensor 231, resulting from exposure to light, or in corresponding positions in an image generated by the image sensor. The 2D image data is typically corresponding to light intensity and/or color, and are for example in the form of intensity values indicating, or identifying, an intensity of the captured light. For embodiments herein, the 2D image data of a certain position or pixel comprise information about a corresponding position on the object that reflected the second light(s), i.e. the 2D image data of a certain position corresponds to image data with information about how a corresponding position of the imaged object reflects the second light(s).

As used herein, "3D image data based on an intensity peak position resulting from light triangulation" may be understood as data that comprise at least depth and/or height information about a corresponding position on the measure object that reflected the first light resulting in said intensity peak position. For example, for the profile images 141-1 . . . 141-N shown in relation to FIG. 1, with identified intensity peak positions (as SP1s) shown in sensor coordinates u, v, the intensity peak position at a v for each position u comprises information about depth of the imaged object 120, more specifically depth information about the position on the object 120 that reflected the light 112 resulting in the intensity peak position at the v. In other words, the sensor coordinates, that may be in sub-pixel resolution, of the intensity peak position corresponds to 3D image data and thereby comprise 3D image data. This can be expressed as that respective first sensor position, such as identified by its coordinates, corresponds to and thus contain 3D image data.

In practice, 3D image data regarding a position on the object that reflected the first light may be a 3D position of an intensity peak position in u, v, t that maps to a position in x, y, z on the object, or it may be a corresponding 3D position in coordinates x', y', z' of a 3D model of the object, which model has been provided from computation based on u, v, t and known operational conditions and relations used in the light triangulation.

The method and actions thus relate to provision of 2D image data associated with 3D image data from light triangulation. The 2D image data is relevant for the same position on the measure object that the 3D image data come from since the 2D image data, as explained above and further explained and exemplified below, is obtained in relation to and preferably in connection with obtaining image frames, said first images (IM1), with the first intensity peaks (SP1s) used for the light triangulation, and by using the same camera and image sensor, but without being limited to obtain the 2D image data from illumination by the same light source as used to obtain the 3D image data. As a result, a great variety of 2D image data associated with 3D image data can be obtained, e.g. based on using different kind of light and/or illumination, including illumination from different directions and positions.

The second light 251, or second lights, for example in case of several second light sources, is/are advantageously diffuse, and/or may be provided by one or more Light Emitting Diodes (LEDs), that thus the second light source 250 may be based on. At least one of second light sources may provide diffuse second light. Diffuse light is in contrast to the first light 111 that typically is very directional, such laser light. Diffuse light enable reflectance without laser speckles. Another advantage with diffuse second light(s) is simpler system setup, easier to accomplish suitable intensity at SP2 and also at SP1. Diffuse light is also closer to normally occurring illumination and may therefore be better to capture desired 2D image data about the measure object. Some embodiments may also become simpler to implement with diffuse second light(s).

Figure 3A:
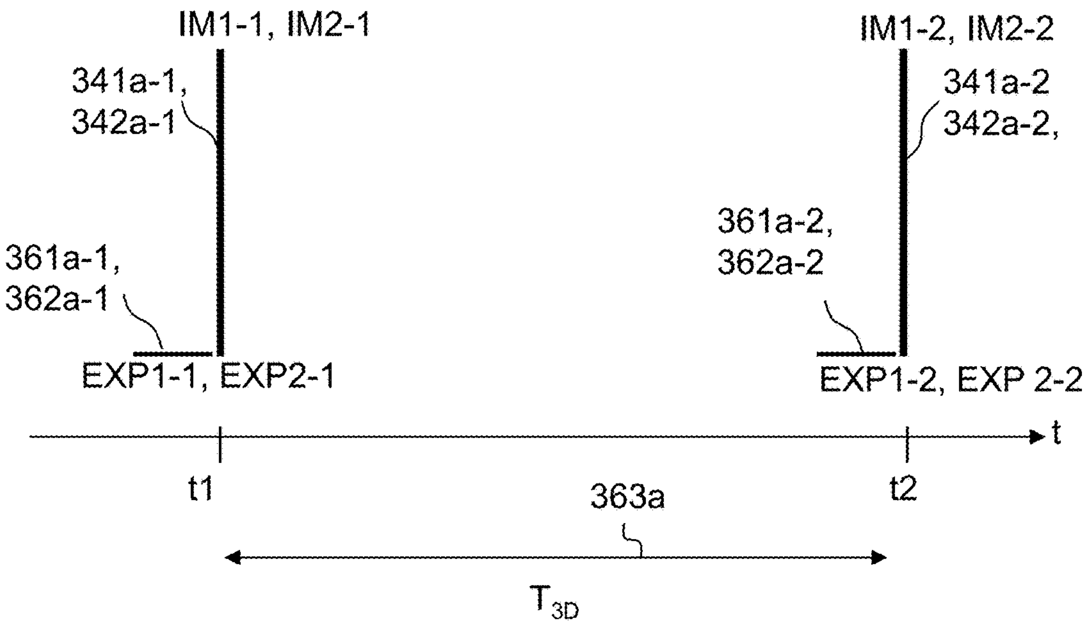
FIGS. 3A-B schematically illustrates situations for two main groups of embodiments disclosed in the earlier application and described in relation to FIG. 2B.
Figure 3B:
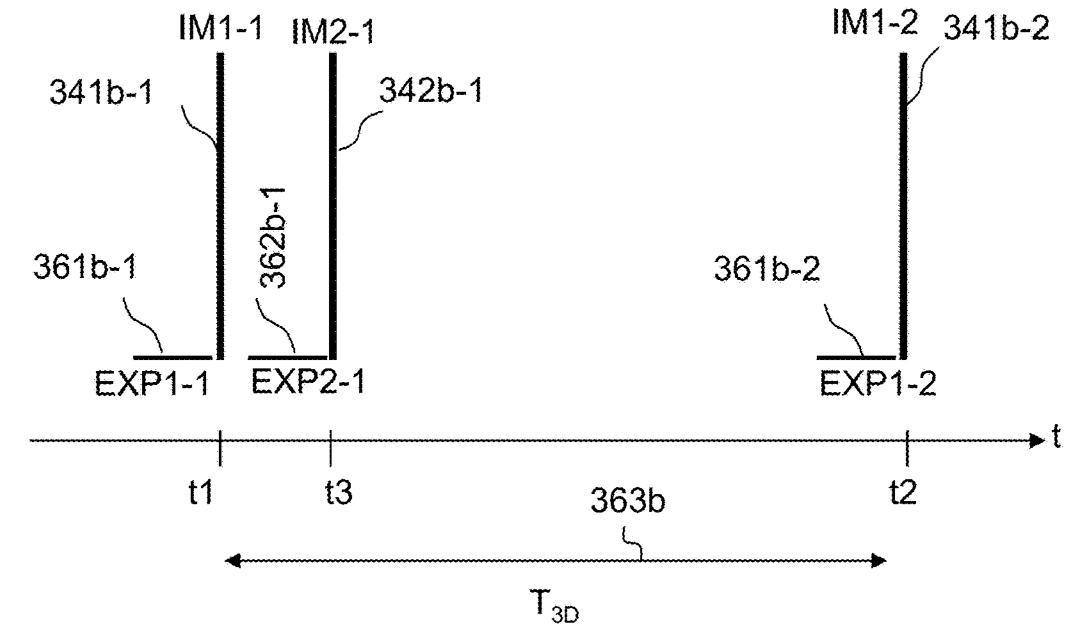

FIGS. 3A-B schematically illustrates situations for two main groups of embodiments disclosed in the earlier application and described above in relation to FIG. 2B. In short: FIG. 3A is about a first main group where said second image (IM2) is the same as the first image (IM1) and thus also that the second exposure period (EXP2) is the same as the first exposure period (EXP1). FIG. 3B is instead about a second main group with the second image (IM2) separate from first image (IM1), whereby it also has its own separate exposure period (EXP2) located between first exposure periods, here between EXP1-1 and EXP1-2 of first images IM1-1, IM1-2. The second image IM2-1 and its second exposure period EXP2-1 is for this group thus generated between IM1-1 and IM1-2, that is, between images used for the light triangulation.

FIG. 3A, regarding said first main sub-group, more specifically and schematically shows a second image **342*a*-1, corresponding to IM2-1 and that in this example is the same image as a first image 341*a*-1 corresponding to IM1-1. The second image 342*a*-1 is generated using a second exposure period 362*a*-1, corresponding to EXP2-1, and that for this group is the same as a EXP1-1 and first exposure period 361*a*-1. It is also shown a further first image 341*a*-2 corresponding to IM1-2 with a first exposure period 361*a*-2 corresponding to EXP2. The shown images IM1-1 and IM1-2 thus correspond to images used for the light triangulation. The first image IM1-1 341*a*-1 is associated with a capture time t1 and the second image 341*a*-2 is associated with a capture time t2. The difference $T_{3D}$ between t2 and t1, that is, $T_{3D}$=t2−t1 is a time period 363*a* that corresponds to the time period between subsequent images part of the light triangulation for provision of the 3D image data, typically corresponding to a scan rate. Note that the illustrated lengths in time of the exposure periods are just to show that there is also an extension in time involved, as in conventional 3D imaging by light triangulation, but what is shown is schematic and not illustrating desirable relation to any actual time period $T_{3D}$ between subsequent image frames used in light triangulation. The exposure periods and time period between subsequent images may be as for conventional light triangulation, although it in some cases may be of interest to adjust the exposure periods to accomplish suitable sensing of both the reflected first light 211 and the reflected second light 251** in the same image.

In case of the first main group, respective second sensor position (SP2) is, as in Action 202 of the method in FIG. 2B, selected in the first image 341*a*-1, i.e. in IM1-1, with a respective difference (d) in sensor coordinates to the respective first sensor position (SP1).

FIG. 3B, regarding said second main group, more specifically and schematically shows a second image 342*b*-1, corresponding to IM2-1 and that in this example is a separate image from a first image 341*b*-1 corresponding to IM1-1. The second image 342*b*-1 is generated using a second exposure period 362*b*-1, corresponding to EXP2-1, that thus is a new and/or separate exposure period and relate to an image that is not used for the light triangulation as such but in a time period between such images, here between the first exposure period 361*b*-1 corresponding to EXP1-1 and a further first exposure period 361*b*-2 corresponding to EXP1-2. The second exposure period 362*b*-1 is the exposure period of the second image 342*b*-1 corresponding to IM2-1. It should be realized that the figure shows an example where said one or more second exposure periods (EXP2) and one or more second images (IM2s) are just one. However, in practice there are typically further subsequent IM2s with second exposure periods, such as an IM2-2 with EXP2-2 following the IM2-1 with EXP2-1 etc.

The shown first images IM1-1, IM 1-2 and first exposure periods EXP 1-1, EXP2-1 and time period $T_{3D}$, may be as their counterparts in FIG. 3A, and/or may be as for conventional light triangulation and the first exposure periods for first images are typically of the same length.

In both FIGS. 3A-B and for both main groups, the first images IM1-1 and IM1-2 correspond to images capturing the first light and thus used in and for the light triangulation discussed above in relation to FIG. 2B, and the second image(s) IM2-1 is for capturing reflected second light 251 and thereby 2D image data.

A difference compared to the first main group is that for the second main group the first light 211 may be, and advantageously is, prevented from illuminating the object 220, e.g. by being switched off, attenuated or directed elsewhere, during the one or more second exposure periods (EXP2), such as during 362*b*-1. This is possible thanks to that second images IM2s are separate from the first images IM1, that is, separate second images for capturing the reflected second light 251. This can be used to remove the risk for light disturbance from the first light e.g. laser, in the IM2s and thereby also greater freedom in selecting SP2s.

Figure 4A:
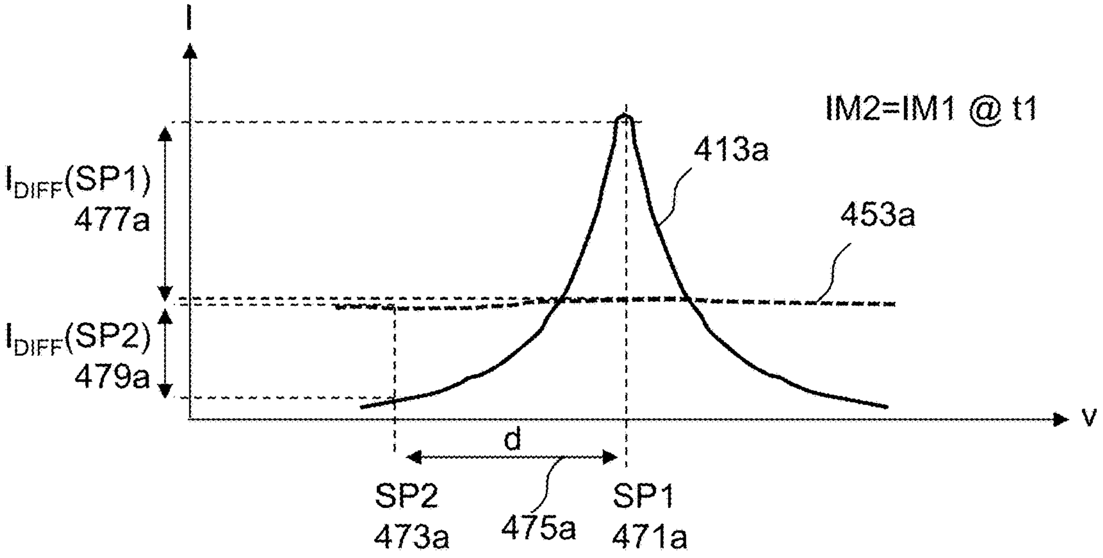
FIG. 4A-C schematically illustrates examples relating to a first of said main groups and FIGS. 4B-C are examples relating to a second of said main groups.
Figure 4B:
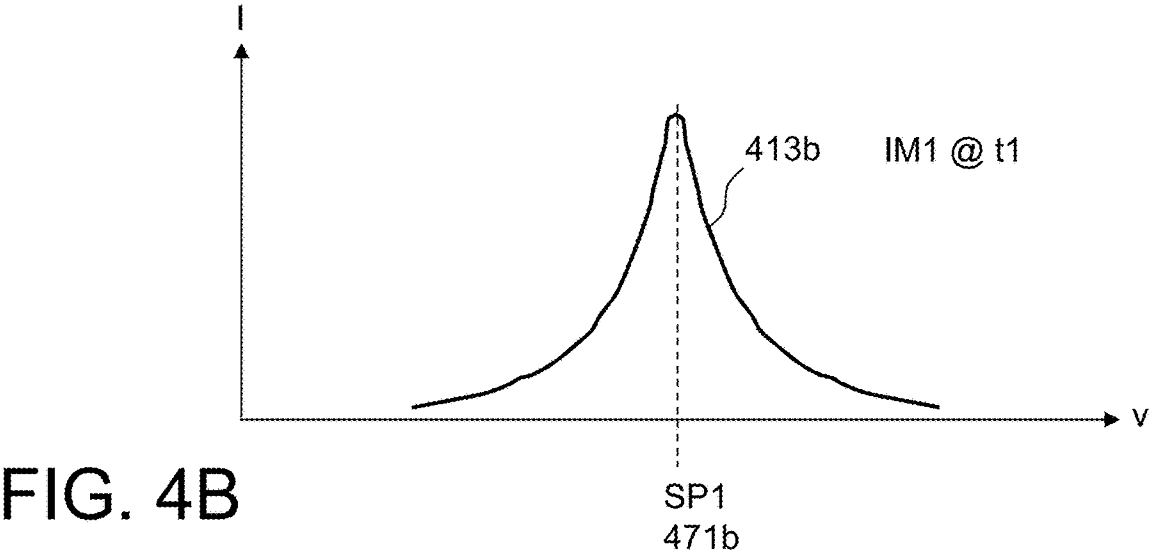
Figure 4C:
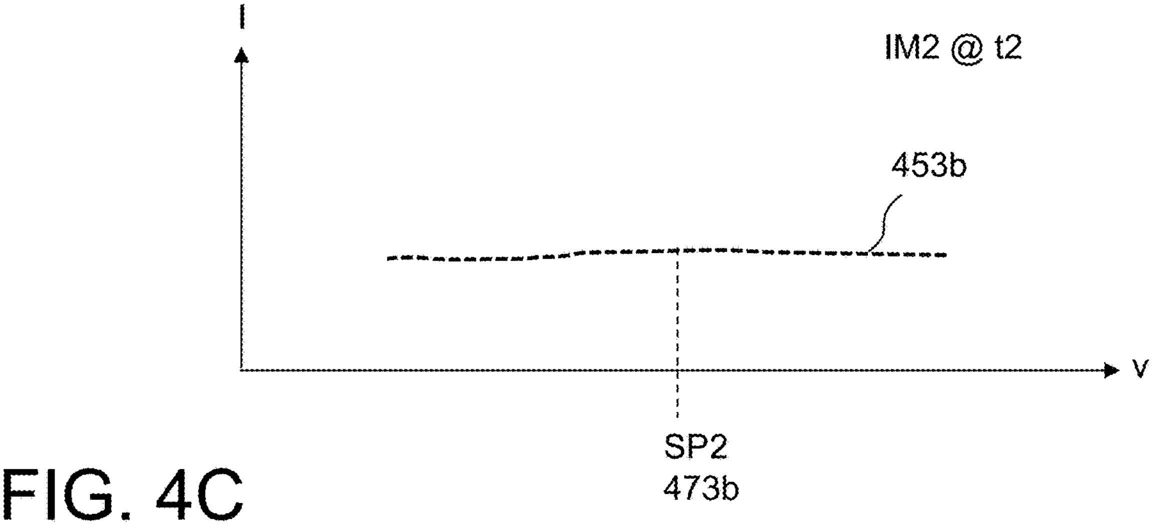

FIG. 4A-C schematically illustrates examples relating to the first of said main groups and FIGS. 4B-C are examples relating to the second of said main groups.

FIG. 4A, relating to said first main group, shows light intensities along image sensor coordinates v, corresponding to reflected light from an object, e.g. the object 220, such as sensed by the image sensor 231 during any of said first exposure periods (EXP1) and e.g. comprised in on of said first images (IM1). As mentioned above, for the embodiments according to the first main group, IM2=IM1 and EXP2=EXP1. Contributions from the reflected first light 211 and the reflected second light 251 are shown separated in the figure for explanatory reasons. The contribution from the reflected first light, such as first light 211 reflected from the object 220 and sensed by the image sensor 231, corresponds in the figure to a first light intensity distribution 413*a*. The contribution from the reflected second light, that is, second light 251 reflected from the object 220 and sensed by the image sensor 231, corresponds in the figure to a second light intensity distribution 453*a*. In other words, the first light intensity distribution 413*a* is an example of first light 211 that has been reflected, i.e. reflected first light, and the second light intensity distribution 453*a* is an example of second light 251 that has been reflected, i.e. reflected second light. In practice the light intensity distributions 413*a* and 453*a* are superimposed, corresponding to adding the shown distributions, thereby forming a single light intensity distribution that corresponds to what is sensed by the image sensor.

The first light intensity distribution 413*a* is rather narrow and has an intensity peak position 471*a* corresponding to SP1, as typically is the case when illumination is structured light, for example a light plane resulting in a light line, such as a laser line, on the object. The second light intensity distribution 453*a* is at a substantially constant level, as typically is the case when the second light is provided as diffuse light illuminating the object.

It was above in connection with FIG. 3A with reference to Action 202 stated that respective second sensor position SP2 is selected in a first image IM1, with a respective difference (d) in sensor coordinates to the respective first sensor position (SP1). A second sensor position 473*a*, corresponding to SP2, is shown in FIG. 4A. Said difference, d, is shown as a difference 475*a* in the figure.

Further, above under Action 202, it was stated that said illumination with the one or more second lights 251 should be provided such that during said one or more second exposure periods (EXP2), any reflected second light from the object, such as according to the second light intensity distribution 453*a*, results in higher intensity than reflected first light 211 in the selected second sensor positions (SP2). When IM2=IM1 and EXP2=EXP as for the first main group, an example of how it may look like is illustrated in FIG. 4A, where the second light intensity distribution 453*a* is above the first light intensity distribution 413*a* in the second sensor position 473*a*, i.e. in SP2. There is thus a difference in light intensity contribution from the first and second lights in SP2, i.e. a $I_{DIFF}$(SP2), which is shown as a light intensity difference 479*a* in the figure.

In contrast, the second light intensity distribution 453*a* is below the first light intensity distribution 413*a* in the first sensor position 471*a*, i.e. in SP1. This is also in line with what was indicated above in connection with FIG. 3A, and Action 201, viz. that the illumination may be provided so that during the first exposure period (EXP1), any reflected second light should result in lower intensity than intensity from reflected first light in the first sensor positions (SP1). There is thus also a difference in light intensity from the first and second lights in SP1, i.e. a $I_{DIFF}$(SP1), which is shown as a light intensity difference 479*a* in the figure.

From the figure it should be realized why SP2 should be selected with a difference d from SP1 for the first main group, i.e. where first and second lights are sensed in the same image, i.e. where IM1 and IM2 are the same. The reason is that the second light(s) should dominate in SP2 and preferably be as little affected as possible by the first light, although it may be difficult to totally avoid this when IM2=M1 and both the reflected first and second lights are imaged at the same time. Of course, SP2 should also be a position that is close enough to SP1 so that 2D image data in SP2 is considered relevant for 3D image data based on SP1.

Similarly, reflected first light should beneficially dominate in SP1 so that the intensity peaks and thereby light triangulation are not negatively affected. The intensity peak positions should be identifiable, e.g. as conventionally, despite any presence of second light(s). The first light intensity peak should preferably be as little affected as possible by the second light.

In practice the skilled person can easily provide second light(s) with suitable intensity level and/or light distribution, such as exemplified in the figure. In cases, e.g. with diffuse light and an even distribution of second light(s), for a given SP2, an increased $I_{DIFF}$(SP1) means a decreased $I_{DIFF}$(SP2). It is then about finding a suitable balance between these and/or select SP2 suitably. For most practical situations, for example with an even second light distribution, this will not be a problem since the second light intensity level typically without any problem can be kept well below the first light peak intensity level that also decreases rapidly when moving away from SP1, i.e. the peak is quite narrow. If needed for a specific application, the skilled person will be able to, e.g. through routine testing and experimentation, select a suitable SP2 and second light(s) intensity level for SP2.

FIGS. 4B-C relate to said second main group and show light intensities along image sensor coordinates v, corresponding to reflected light from an object, e.g. the object 220, and sensed by the image sensor 231. FIG. 4B shows sensed reflected first light 211 during EXP1 and e.g. comprised in IM1, while FIG. 4C shows sensed reflected second light 251 during EXP2 and e.g. comprised in IM2 that for the second main group, as explained above, is separate from IM1. FIG. 4B shows a first light intensity distribution 413*b* that corresponds to and may be the same as the first light intensity distribution 413*a*. FIG. 4C shows a second light intensity distribution 453*b* that corresponds to and may be the same as the second light intensity distribution 453*a*. In this situation, although not shown in figures, in case of further second images, IM2, such as an IM 2-2, yet another figure as FIG. 4C could be provided with yet another second light intensity distribution resulting from sensing of reflected second light(s) during a further EXP2, such as an EXP2-2 resulting in said further IM2 that is, the IM 2-2-.

A first sensor position 471*b*, corresponding to SP1, is shown in FIG. 4B. A second sensor position 473*b*, corresponding to SP2, is shown in FIG. 4C.

It was above in connection with FIG. 3B, stated that the first light 211 may be, and advantageously is, prevented from illuminating the object 220, during the one or more exposure periods (EXP2), e.g. the second exposure period 362*b*-1. Any first light can thereby not be captured in IM2, which clearly is the case in FIG. 4C. Similarly, as also mentioned above, the second light 251 may be prevented from illuminating the object 220 during the first exposure period 361*b*-1, i.e. during EXP1-1, and thus not captured in IM1, as can be seen in FIG. 4B. As realized from comparing FIGS. 4B-C with FIG. 4A this means that the reflected first light and second light do not interfere with each other independent on where SP2 is selected in relation to SP1. Hence, thanks to that only reflected first light or second light is present at the same time in an image, there is no need to position SP2 at a distance d from SP1 as in FIG. 4A, instead SP2 can, as indicated in FIGS. 4B-C, e.g. be in the same sensor position as SP1, which makes it very simple to select SP2. In other words, the respective second sensor position, SP2, in said one or more second images (IM2), e.g. 342*b*-1, may be selected at the same respective first sensor position, SP1, e.g. 471*b*, as the intensity peaks in the first image (IM1), e.g. 340-1. Of course a distance in sensor position v, corresponding to d, is typically acceptable also for these embodiments.

Note that since light triangulation is typically performed with a continuous movement of the measure object and/or camera/light source in relation to each other, an IM2 at another time than IM1, e.g. at the time t2 that is later than IM1 at the time t2, means that there nevertheless has been some change in object position that map to one and the same sensor position. In other words, SP2, even at the same sensor position as SP1, may still map with some offset to the actual object position on the measure object that reflected the light resulting in the intensity peak position SP1. However, in general, and for in principle all conventional and practical light triangulation systems, the difference in object position between two consecutive images used in and for the light triangulation, such as between IM1-1 and IM1-2, will typically be smaller than any d as discussed in relation to FIG. 4A. However, still, to make 2D image data in SP2 to be as relevant as possible for SP1 when in the same sensor position, e.g. for same u, v, IM2 may be provided as soon as possible after IM1, minimizing the distance caused by any movement between t1 and t2. For example, said one or more second exposure periods (EXP2) may be exposure period(s) adjacent to a first exposure period (EXP1), e.g. as close as possible before or after EXP1. For cases where EXP2 are several exposure periods these may be consecutive and following as soon as possible after each other and as close as possible to EXP1.

Of course, SP2 could also be selected with some offset in sensor position to compensate for movement and change in measure object position between t1 and t2, but this will typically not be needed. A greater offset may be needed to be accepted between object position mapping to SP1 and object position mapping to SP2 for embodiments according to the first main group compared to the second main group.

A solution that completely removes any offset, is to make sure that there is no relative movement between the object 220 and the image sensor 231 between IM1 and IM2, is by temporarily stopping the relative movement used in the light triangulation, for example stopping at t1 and starting again at t2. This however is typically not desirable for practical reasons and may also cause a reduced light triangulation system throughput if implementation is by adaptation of an existing light triangulation system.

Figure 5A:
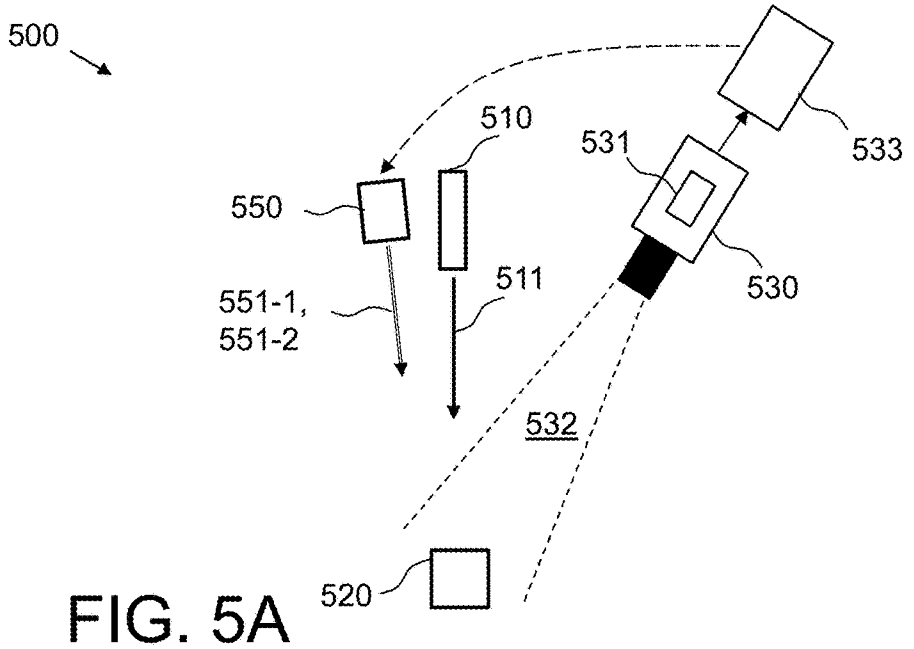
FIG. 5A schematically illustrates a simplified example of a an imaging system that can be configured to carry out light triangulation and embodiments herein.

FIG. 5A schematically illustrates a simplified example of a an imaging system 500 that can be configured to carry out light triangulation and embodiments herein. The imaging system 500 is thus for 3D imaging based on light triangulation and for capturing information on both 2D and 3D characteristics of one or more objects. Such object is exemplified by an object 520 in the figure and shown within field of view 532 of a camera 530 of the imaging system 500. The shown system corresponds to a basic configuration and comprises:

A first light source 510 in the for illuminating the object 520, corresponding to a measure object, with first light 511 used in the light triangulation, thus structured light, such as a light, or laser, plane.

Second one or more light sources for illuminating the object 220 with two or more second lights 551, exemplified by second lights 551*a*-1 and 551*a*-2 in the figure. These lights are for 2D imaging of the object 520.

Said camera 530 with image sensor 531 is arranged for sensing reflected first light from the object 520 as part of said 3D imaging by light triangulation and for sensing reflected second lights from the object 520 for said 2D imaging.

The camera 530, image sensor 531 and first light source 510 are configured and positioned in relation to each other for light triangulation and may thus be as in conventional light triangulation. The system 500 may for the light triangulation purpose correspond to the system 100 in FIG. 1 or system 200 in FIG. 2A, i.e. regarding the first light source 510, the camera 530, the image sensor 531, how they are positioned in relation to each other and the object 520 etc., but additionally configured to perform according to embodiments herein. The image sensor 531 should of course also be sensitive to the second lights being used. This will typically be the case for all conventional image sensors used for light triangulation, at least regarding human visible light, but there is often also sensibility to light also outside the visible spectrum, at least regarding adjacent wavelengths, for example regarding infrared light. If needed a conventional 3D imaging system based on light triangulation can be adapted by switching to a camera and/or image sensor sensible also to the second lights used in embodiments herein, in addition to first light used for the light triangulation.

The imaging system 500 may correspond to the imaging system 200 discussed above for carrying out the actions and method of said earlier application, but with difference that there are said one or more light sources configured to provide illumination by at least two second lights with different light wavelength content, that is, with multispectral content. The imaging system 500 should also be operated and/or be configured differently in order to carry out actions according to embodiments herein that differ from the actions described above with reference to the imaging system 200. Hence, to avoid repeating information, in the following, focus is mainly on differences compared to what has already been described above for and in relation to the imaging system 200 and corresponding components thereof. Hence, generally, what is not described differently below may be assumed to be as described above for the imaging system 200 and for corresponding components therein.

Image frames and/or information derived from image frames provided by the camera 530 and the image sensor 531 may just as in the imaging system 200 be desirable to transfer, e.g. transmit, for further processing outside the camera 530, e.g. to a computing device 533, such as a computer or similar, that may correspond to the computing device 233. and that may be part of or external from the imaging system 500 as such. Such further processing may additionally, for example in a distributed manner, or alternatively be performed by some remote and/or separate computing unit(s) or device(s) (not shown), for example a remote server and/or computer(s) part of a computer cloud. Said further processing may involve carrying out one or more actions of embodiments herein, such as described below.

In some embodiments, not shown in the figure but similar as for the imaging system 200, the computing device 533 is separate from the image processor 531 but still comprised in, e.g. integrated with, the camera 530, or a unit comprising the camera 530. The computing device 533 or other similar device(s) as mentioned (not shown) may be configured to control devices involved in the light triangulation and/or involved in embodiments herein, so that actions relating to embodiments herein are performed, including for example both the 2D imaging and the 3D imaging. This may include that the computing device 533, as indicated in the figure, or similar device(s), is configured to control the illumination by the second lights, for example by controlling said one or more light sources, such as the second light source 550*a*, that provide the illumination by the second lights. This may involve controlling when to switch which second light on/off, for how long, illumination on time duration for respective second light, etc.

The second light source(s) 550*a* may be in a fix position in relation to the camera 530 and first light source 510 but exact position and relation to the camera 530 and image sensor 531 is not utilized as in light triangulation and the second light source(s) can thus be arranged more freely with the purpose to provide the second lights and illumination according to various embodiments herein. However, it is for embodiments herein typically an advantage to keep the light source(s) that provide the second lights of different wavelength together so that the illumination of the second lights with different wavelengths come from the same or substantially the same location with the same or substantially same illumination direction. This since it is typically of interest that the multispectral second lights all illuminate the same object locations. This is facilitated by illumination of the second lights from same location and in same direction since it reduces the risk that some second light does not succeed in illuminating of the same object location as another second light. For this reason it may also be advantageous to place the second light source(s) in a position or positions near the first light source and/or with main part of the illumination being provided in a direction close to the illumination direction of the first light. Such situation is illustrated in the figure.

If the second lights are provided as diffuse illumination, which typically is desirable as mentioned above, the same or approximately same location should suffice since exact direction then becomes less relevant. Diffuse light Illumination by multispectral second lights from approximately the same location and in a similar manner can be accomplished for example by use of a single illumination unit as the light source(s) 550*a*, as will be discussed next.

Note that same location and/or direction here relate to the multispectral lights of different wavelength, for example second lights in one and the same illumination unit. It may then be additional one or more further such illumination units of second lights, or other second light(s), at different locations in the imaging system and/or with different illumination directions, in similar manner as disclosed in said earlier application regarding several second light sources.

Figure 5B:
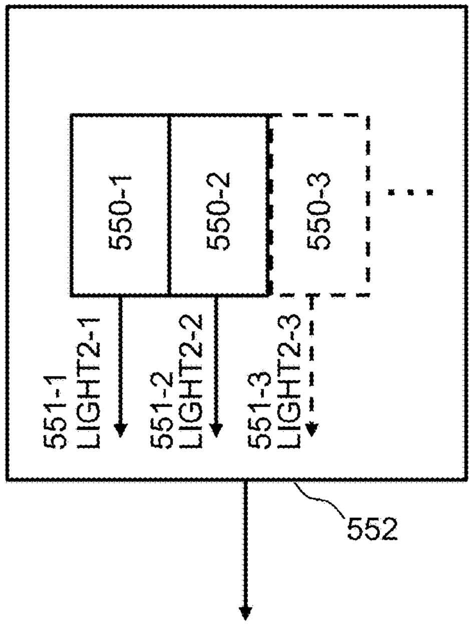
FIG. 5B is a schematic example of second light source(s) as in FIG. 5A implemented as a single illumination unit that comprises multiple second light sources.

FIG. 5B is a schematic example of the second light source(s) 550 implemented as a single illumination unit 552 that comprises multiple second light sources, here two or more (sub) light sources 550-1, 550-2 for provision of the second lights 551-1, 551-2, respectively. There is also shown how such unit can comprise further one or more second light sources for provision of further second light(s) in a similar manner, exemplified in the figure by a third second light source 550-3 for providing a third second light 551-3.

Respective second light from the second light sources may pass through a common lens and/or diffusor of the illumination unit so that the provided illumination of the second lights out from the illumination unit 552 will be more similar to each other except from the difference in wavelengths As a first example of an alternative to what is shown in FIG. 5B, there are multiple second light sources but provided separately, such as in separate illumination units, for example arranged in the imaging system 500 side by side and/or grouped together for provision of the second lights.

As a second example of an alternative to what is shown in FIG. 5B, there is a single second light source that provides illumination of multispectral second lights via an arrangement with one or more optical filters, for example electrically and/or mechanically controlled filters, that pass through second lights of different wavelengths. The second light source may thus provide all wavelengths, for example a range, and respective filter then selects out one or more, typically a respective subrange, of wavelengths from these as respective second light.

Figure 5C:
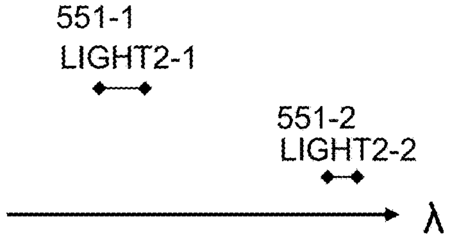
FIG. 5C schematically illustrates that the second lights may be non-overlapping in wavelengths.

FIG. 5C schematically illustrates that the second lights in general, or two or more of them, such as the second lights 551-1, 551-2, may be non-overlapping in wavelengths, for example second lights with non-overlapping wavelength ranges. Non-overlapping wavelengths are preferred in many applications and can also simply be accomplished by using different light sources, for example based on LEDs of different types.

Figure 5D:
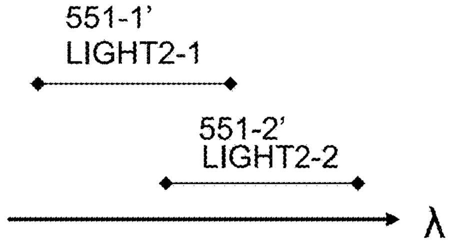
FIG. 5D schematically illustrates that the second lights may partially overlap in wavelengths.

FIG. 5D schematically illustrates that the second lights in general, or two or more of them, alternately or additionally to having non-overlapping wavelengths, may partially overlap, illustrated in the figure by second lights 551-1' and 551-2' as exemplifying alternatives to the second lights 551-1, 551-2. Partial overlap means that there are some wavelength(s) but not all of a second light is present also in another of the second lights. When this is the case, it is may be preferred but no necessary that this is mutual, which is not the case if one of the second lights is formed by a subrange of wavelengths of another of the second lights (not shown in the figure). This can be of interest in some applications but in general it is more useful with no or only partial overlap and thereby more separation in wavelength content between the second lights.

FIG. 6 is a flowchart for schematically illustrating a method according to embodiments herein, thus with multi-spectral second lights. What is disclosed here can be seen as a special case of the method discussed above in relation to FIG. 2B and as disclosed in said earlier application, or at least based on same principles as disclosed therein.

The actions below, which may form the method, are for associating 2D image data with 3D image data generated from light triangulation performed by an imaging system, herein exemplified by the imaging system 500, for 3D imaging of an object, for example the object 520. The imaging system thus comprises a first light source, exemplified by the first light source 510, for illuminating the object with first light, exemplified by the first light 511, and a camera, exemplified by the camera 530, with image sensor, exemplified by the image sensor 531. The imaging system also comprises one or more second light sources, exemplified by the second light source(s) 550, for illuminating the object 520 with two or more second lights, exemplified by the second lights 551, that are multispectral by differing from each other by comprising different light wavelengths. The light triangulation as such may be as in conventional 3D imaging based on light triangulation and thus comprises to illuminate different consecutive portions of the object 520 with the first light 511 and sense reflected first light from respective portion by the image sensor 531 in a respective first image (IM1). IM1s may correspond to IM1s as discussed above in relation to the method of FIG. 2B. They are further discussed and exemplified below in relation to FIGS. 7-8 regarding embodiments herein.

The method and/or actions below and indicated in FIG. 6 may be performed by device(s), i.e. one or more devices, such as the camera 530 and/or the computing device 533, or by the imaging system 500 and/or suitable device(s) thereof or connected to it. Device(s) for performing the method and actions thereof are further described below.

Note that the actions below may be taken in any suitable order and/or be carried out fully or partly overlapping in time when this is possible and suitable.

Action 601

Said 3D data is obtained as first sensor positions (SP1s) of IM1s generated by the camera 530 and image sensor 531. The SP1s are corresponding to locations of intensity peaks of reflected first light from the object 520 as part of said light triangulation. SP1s here may correspond to SP1s as discussed above in relation to the method of FIG. 2B and are further discussed and exemplified below in relation to FIGS. 7-8 regarding embodiments herein.

Action 602

Two or more second images (IM2s), generated by the camera 530 and image sensor 531 are obtained. The IM2s are imaging the object during illumination by said two or more second lights 551, respectively. Respective IM2 is associated with a respective IM1 of said IM1s. Respective IM2 may either be, and be associated with, a respective IM1 of said IM1s, or be generated between two of said IM1s and associated with any of them.

An IM2 may thus be an IM1, in other words IM2 and IM1 may be the same image, and/or an IM2 may be separate from IM1, more specifically be generated between IM1s, preferably between consecutive IM1s. In the former case with IM2=IM1, the IM1 associated with the IM2 should be the same image as the IM2 and in the latter case the IM1 associated with the IM2 should be an IM1 generated before or after the respective IM2, typically the IM1 generated closest in time before or after the IM2.

A single IM2 here may correspond to such IM2 as discussed above in relation to the method of FIG. 2B. IM2s as a group, such as in a sequence, according to embodiments herein are further discussed and exemplified below in relation to FIGS. 7-8.

Action 603

In respective IM2 it is selected, for and in relation to respective SP1 of the respective IM1 that the respective IM2 is associated with, a respective second sensor position (SP2). The respective SP2 is a position in the respective IM2 where reflected second light from the object 520 has higher intensity than the reflected first light from the object 520.

The SP2s may correspond to, and/or be selected correspondingly, as the SP2s as discussed above in relation to the method of FIG. 2B. SP2s according to embodiments herein are further discussed and exemplified below in relation to FIGS. 7-8.

Action 604

Intensity values of the selected SP2s are associated with the SP1s they were selected for, respectively. As a result, multispectral 2D data corresponding to the intensity values in the SP2s from the reflected multispectral second lights become associated with the 3D data corresponding to the SP1s that the SP2s were selected for.

There will thus be SP1s corresponding to 3D data of two or more IM1s that map two consecutive portions on the object in accordance with the light triangulation, with SP1s associated with SP2s with 2D image data corresponding to the intensity values from sensed second lights reflected from the object. Since the intensity values result from said illumination of second lights of different wavelengths, they correspond to multispectral 2D image data.

From the above it can further be realized that if the IM2s are generated between IM1s and associated with the same IM1, respective SP1 in this image will be associated with as many intensity values as there are second lights of different wavelengths. There will thus be same resolution of the multispectral 2D image data as the 3D image data. However, if respective IM2 is a respective IM1, for example IM2=IM1 for all images, for example respective one of consecutive IM1 is also an IM2, the resolution of 2D image data will be lower since the "time dimension" in the laser triangulation map to a third dimension of the 3D image data, in the shown examples herein to the "y dimension". For example, if there are two different second lights and the respective IM2 is a respective IM1, there is needed two IM1s, one per second light, to form multispectral image data. Thus the resolution of 2D image data is half of the 3D image data. In practice, it will typically be so that the 2D image data resolution is lower than the 3D data resolution, or equal, but the other way around is less likely to be of interest.

To get combined image data with the same resolution of 3D image data and 2D image data, images with the image data may be formed "per light", for example one with 3D image data and one per second light with 2D image data. In the example of 2 second lights and half the resolution of 2D image data compared to the 3D image data, the 2D image data may then be up-sampled by a factor 2. The resulting image data with the same resolution can then easily be combined into a single combined image where each pixel, or voxel, according to the 3D image data and thus corresponding to an object point according to the light triangulation, will be associated with 2 intensity values, one per second light and thus multispectral 2D image data. A practical example of this principle is discussed in relation to FIGS. 9A-D. In general, as should be understood, the underlying principle of embodiments herein can be used independent on which data has lower or higher resolution than the other, by utilizing up and/or down sampling to reach the same resolution for respective image data and then combine. Of course, relevant information can be extracted from 2D image data associated with 3D image data also without first makes sure all image data is of the same resolution.

Action 605

With reference to the discussion above, in some embodiments, the 3D image data and the 2D image data are provided in same resolution.

If resolution of the 3D image data and the 2D image data differ after execution of actions as above, as is the case for some embodiments herein, the provision of the image data into the same resolution may be accomplished by up- and/or down-resampling of the 3D image data and/or the 2D image data. That is, by suitable up- and/or down-resampling, that can be accomplished in various ways as recognized by the skilled person.

Action 606

The 3D image data and the 2D image in the same resolution may be combined into a combined image. As a result respective 3D image data point of the image becomes associated with multispectral 2D image data corresponding to intensity values resulting from the reflected said two or more second lights comprising different wavelengths.

As explained above and elsewhere herein, difference in resolution of the 3D image data and the 2D image data is typically the result when the IM1s and the IM2s regarding different second lights are generated at different rates. For example if there is a sequence of three consecutive IM2s with different second lights, say second light corresponding to colors "Red", "Green", "Blue" (R, G, B) generated during the same time as 3 IM1s with first light, or in other words, respective IM2 is a respective IM1, the rate of "IM2 per color" will be ⅓ of the rate of the IM1s, and thus second image data per color R, G, B will be of ⅓ the resolution of the 3D image data. The reduced resolution is in the dimension corresponding to time according to the laser triangulation, which is the dimension corresponding to y in the examples herein. (In the other dimensions, such as z, x in the examples herein, the resolution is the same as also may be realized from that respective SP2 is selected per SP1 and thus with a 1:1 relation therebetween.) By up-sampling said respective second image data corresponding to R, G B, by a factor 3 in said dimension, the 3D image data and the 2D image data will be of the same resolution. An alternative in this example could be to down-sample the 3D image data by ⅓ but this is typically not preferred since 3D information is lost when the resolution s lowered like this.

As already indicated above, in some embodiments, said second lights comprise one or more of: Red light (R), Green light (G) and Blue light (B). With all three full color 2D image data can be accomplished. As used herein, a typical definition of R is light with a wavelength or wavelengths in a range 620-750 nm, with 625 nm as a typical wavelength and that may be provided by a red LED. As used herein, a typical definition of G is light with a wavelength or wavelengths in a range 495-570 nm, with 525 nm as a typical wavelength and that may be provided by a green LED. As used herein, a typical definition of B is light with a wavelength or wavelengths in a range 450-495 nm, with 460 nm as a typical wavelength and that may be provided by a blue LED In some embodiments, the second lights comprise R, G, B and differences in illumination duration by R, G, B may be used during the imaging for white balancing. That is, the on and/or off time for respective second light may be controlled separately, for example set to suitable on-durations that may differ, in order to be able to directly achieve a desirable white balance in the resulting 2D image data. This is further discussed and exemplified below in connection with FIG. 8E.

In some embodiment, the second lights comprises second lights corresponding to Infrared light (IR) or Near Infrared light (NIR). As used herein, a definition of NIR is light in a wavelength range of 850-1000 nm and a definition of IR is light with wavelength longer that, that is, any wavelength or range of wavelengths above 1000 nm.

Note that although some light, including for example ultraviolet light, is not explicitly mentioned above, the principles herein are of course applicable also to such light, or different light in general, according to conventional definitions.

In some embodiments, the illumination by said two or more second lights is provided sequentially according to a sequence of said two or more second lights with said second images generated in a corresponding sequence. Said sequence may be certain sequence that may be application specific. The sequence may be repeated one or more times with generation of further IM2s and their associated one or more IM1s in each repeat. In other words, during the repeats further IM1s are generated according to the light triangulation along with IM2s as above, that is, IM2s that correspond to IM1s or are generated between them, etc. This may continue so that the complete object becomes covered, for example scanned, and there have been generated 3D image data with associated 2D image data regarding the whole object. Hence, per sequence repeat there will be one or more IM1s involved and different IM1(s) in each sequence repeat. Hence there will be mapping to different portions of the object in each repetition since the IM1s relate to 3D imaging of different object portions. During for example a scan of the object by the first light as part of said light triangulation, said sequence may thus be repeated and 3D image data captured in accordance with the light triangulation and SP1s during the scan while also multispectral 2D image is captured in SP2s in relation to the SP1s.

In some embodiments, one or more of said second lights are occurring more frequently than one or more other of said second lights in said sequence. That is, one or more or of the second light may occur twice or more before all illumination by the second lights and generation of corresponding IM2s has taken place and/or before the sequence is repeated. For example, when the sequence of second lights comprise R, G and B, G may occur more often than R and B in the sequence, for example twice as often. Thus, the sequence may be or contain RGBG or similar. Greater occurrence of G is known to enhance perceived sharpness color images. This way the resulting 2D image data may be perceived as sharper in an image with combined 2D image data. There may of course also be other reasons for letting some second light(s) occur more frequently than other.

Examples of different sequences are further discussed and exemplified below in relation to FIGS. 7-8.

In some embodiments, the object is organic. That is, the object being imaged may be organic and/or the method may be applied in an application where the object is an organic object. For organic objects, that often differ in 3D appearance but also in 2D, for example with 2D surface variations as well, details about both and in combination are often of great interest. Hence, embodiments herein may be of particular interest to apply in applications with organic objects. For example in applications where the object is one of the following type and/or kinds: plant, tree, log, wood, meat, vegetable, bread, food, waste.

For example, embodiments herein may beneficially be applied in the following application areas:

- Agriculture, where the first light may be a green laser to get good data from green leaves and be able to measure for example plant size and height through 3D image data and at the same time get information about plant status and health from 2D image data by use of second lights with R G and NIR. This can be utilized to optimize use of nutrition and water for plants.
- Food sorting, for example to be able to manage and sort, such as by grabbing, food articles using 3D image data and also be able to detect foreign objects and/or for quality assurance reasons by using 2D image data, where different sorting may be desirable to apply based on the 2D data.
- Waste sorting, for example to be able to manage and sort, such as by grabbing, pieces of waste/garbage food articles using 3D image data and be able to do so in differentiate ways depending on material, color and shapes, where multispectral 2D image data may provide very useful information.
- Wood inspection where information through 3D image data is important but also multispectral 2D image data to for example be able to better differentiate between heartwood and sapwood (at the surface).

Hence, in some embodiments, the object is one of the following type and/or kinds: plant, tree, log, wood, meat, vegetable, food, waste.

Figure 7A:
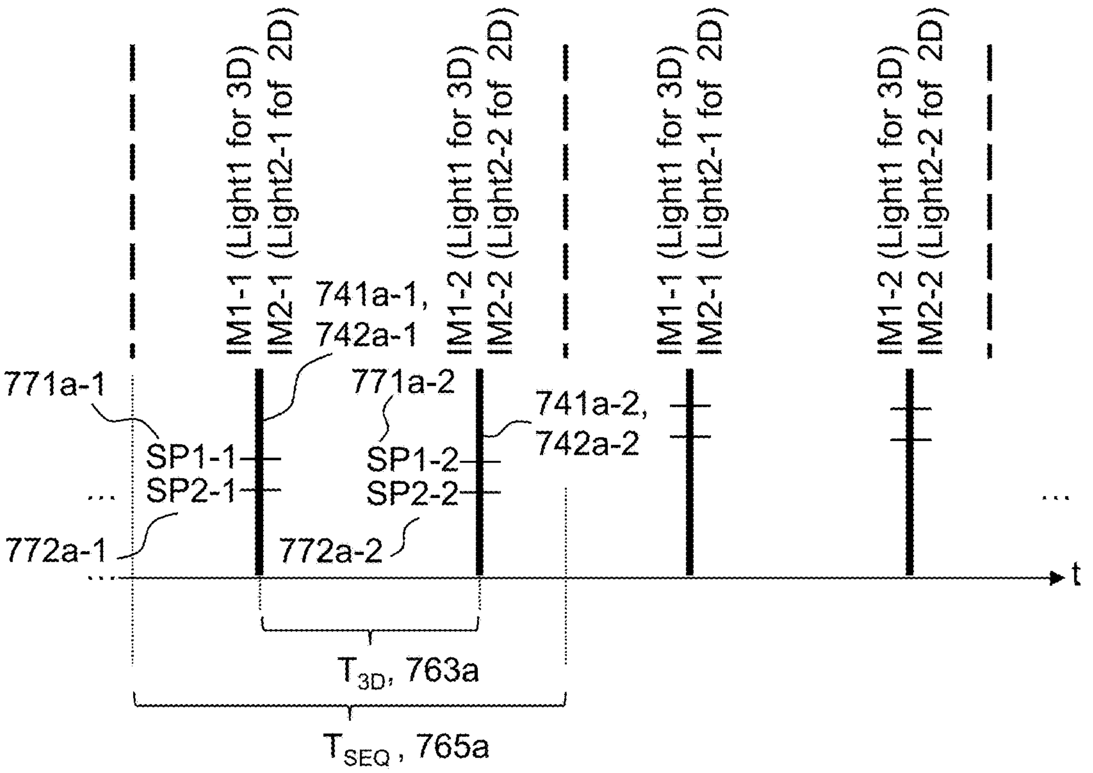
FIGS. 7A-B schematically illustrates situations for corresponding two main groups, respectively, as discussed in relation to FIGS. 3A-B, but in the case of multispectral second lights and in relation to the method according to embodiments herein as described in relation to FIG. 6.
Figure 7B:
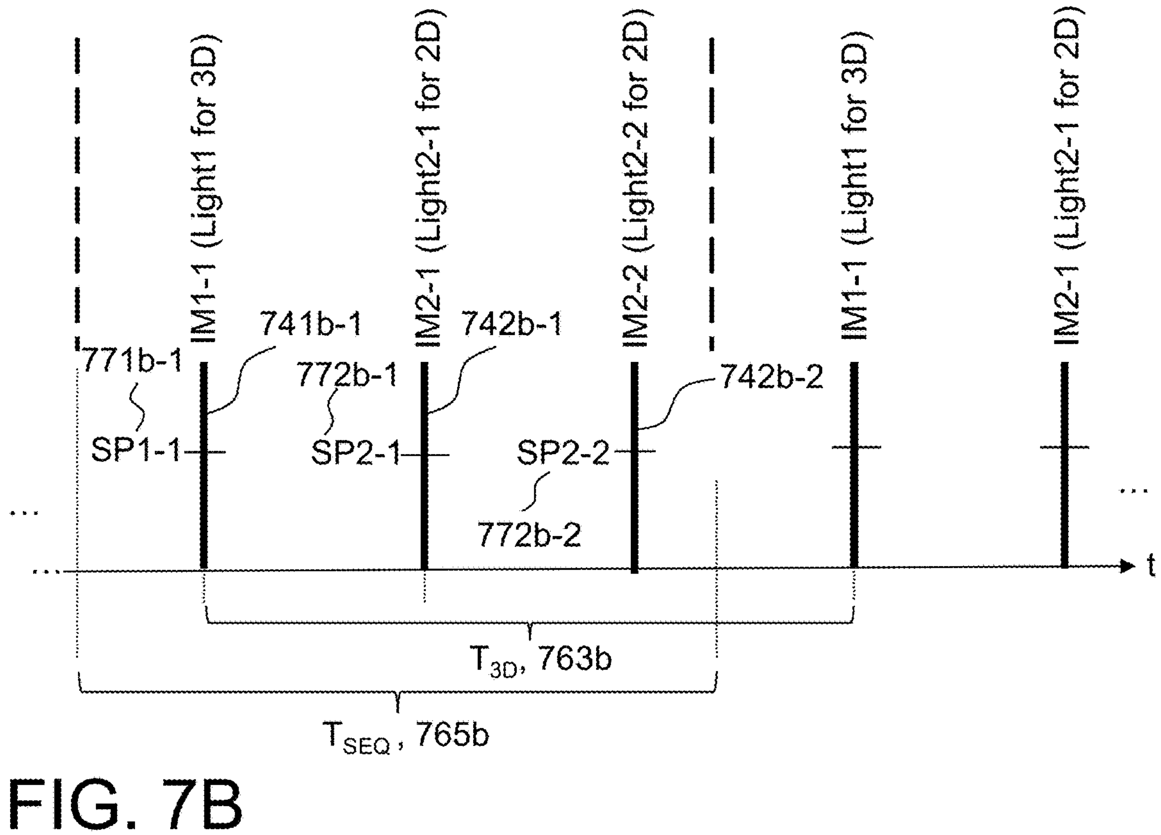

FIGS. 7A-B schematically illustrates situations for corresponding two main examples groups of embodiments herein, respectively, similar as the main groups discussed above in relation to FIGS. 3A-B and in said earlier application, but here in the case of multispectral second lights and in relation to the method according to embodiments herein as described above in relation to FIG. 6. The figure is shown in a similar manner as FIGS. 3A-B is to facilitate comparison and understanding differences. The case with multispectral second lights, as in embodiments herein, can be seen as an extension or special case. Since there are more images involved in these examples, the exposure period indicated in FIGS. 3A-B have been removed in FIGS. 7A-B to save space, although exposure periods of course are present in practice.

FIG. 7A is about the first main example group of embodiment where IM2a are the same as IM1s, that is, the same as the images used for the light triangulation, and thus also with same exposure period of the image sensor.

FIG. 7B is instead about the second main example group of embodiments where the IM2s are separate from and between IM1s, that is, between images used for the light triangulation, and thus the IM2s also have separate exposure periods.

In both figures a period $T_{3D}$ 763 between consecutive IM1s is indicate and corresponds to the time period between consecutive IM1s part of the light triangulation, thus relating to the provision of the 3D image data. The time period $T_{3D}$ 763 typically corresponds to a scan rate used in the light triangulation.

Moreover, to facilitate understanding, the type of lights involved for respective image is indicated in the figures and the kind of image data that respective light is used to generate. First lights are thus indicated as "Light1 for 3D" since the first light is used in the light triangulation for generation of the 3D image data, and the two or more second lights are indicated as "Light2 for 2D" since the second lights are used for generation of the 3D image data. A first of the second light is named "Light2-1 for 2D" and a second of the second lights is named "Light2-2 for 2D" since these are different because said two or more second lights differ in wavelength content as discussed above.

Further, in both figures, a period $T_{SEQ}$ 765 is shown and indicates such sequence discussed above by its period, that is, a sequence of IM2s with respective IM2 being exposed to one of the second lights until all of the two or more second lights have been used according to the sequence that thereafter may and typically is repeated.

Both FIGS. 7A-B show examples with two IM2s per $T_{SEQ}$ 765 and thus in the sequence, but the principle can easily be extended to more than two IM2s, as discussed above and also exemplified further below.

FIG. 7A, regarding said first main example group of embodiments herein, more specifically and schematically shows a $T_{SEQ}$ 765*a* comprising two IM2s that are also IM1s, viz. an IM2-1 741*a*-1 that is the same as a IM1-1 742*a*-1, and an IM2-2 741*a*-2 that is the same as an IM1-2 742*a*-2. It can be seen that in this case the $T_{SEQ}$ 765*a* is twice the $T_{3D}$ 763*a*. In case of more than two second lights and/or a more than two IM2s in the sequence, $T_{SEQ}$ would of course increase further in relation to $T_{3D}$ 763*a*.

Moreover, in the figure it is schematically exemplified a respective SP1 and SP2 in each image: A SP1-1 771*a*-1 and SP2-1 772*a*-1 in the IM1-1 741*a*-1 that is the same as IM 2-1 742*a*-1. A SP1-2 771*a*-2 and SP2-2 772*a*-2 in the IM 1-2 741*a*-2 that is the same as IM 2-2 742*a*-2. As schematically indicated in the figure, and in line with the discussions above, here, since IM2=IM1, the SP2s are with an offset in sensor coordinates to the SP1s so that the captured reflected second light in SP2 dominate over the captured reflected first light, while the first light should dominate over second light in SP1, that is, similar as for the method and examples discussed in relation to FIG. 2B. In other words, and generally regarding embodiments herein, captured reflected second light from the object should have higher intensity than the reflected first light from the object in SP2s. Since the SP1s are result from light triangulation it is implied that first light dominate there and hence that captured reflected second light from the object has lower intensity than the reflected first light from the object in SP1s, or at least that light intensity of second light is sufficiently low in SP1s not to negatively affect detectability of the first light in SP1s.

The figure also shows two further IM1s and IM2s belonging to a repeat of the sequence just to indicate that what is shown is typically repeated, for example so that the whole object becomes 3D scanned by light triangulation and with multispectral 2D image data captured in connection with this and in relation to the 3D image data.

FIG. 7B, regarding said second main example group of embodiments herein, more specifically and schematically shows a $T_{SEQ}$ 765*b* comprising two IM2s that are separate from IM1s, viz. an IM2-1 741*b*-1 and an IM2-2 741*a*-2 that are between a first image IM1-1 742*b*-1 and a further first image IM 1-2 741*b*-2. It can be seen that in this case the $T_{SEQ}$ 765*a* is same as $T_{3D}$ 763*a* although shown with an offset in the figure. When IM2s are separate from IM1s and generated between IM1s, the IM2s are typically but not necessary evenly spaced apart between the IM1s, that is, so the image frame rate that the image sensor operate with can be the same for all images, that is, same for IM1s and IM2s.

In the figure it is schematically exemplified that SP2s are the same as SP1s, since the SP2s in this case, as already mentioned above, can be more freely selected in relation to the SP1s if/when the first light is not present in the IM2s, that is, when/if the first light is not illuminating the object when the IM2s are captured for example by keeping the first light "on" only during exposure of IM1s and off during exposure of IM2s.

A SP1-1 771*b*-1 is shown in IM1-1 741*b*-1. A SP2-1 772*b*-1 being the same sensor position as SP1-1 is shown IM2-1 742*b*-1 and a SP2-2 772*b*-2 1 being the same sensor position as SP1-1 is shown IM2-2 742*b*-2.

The figure also shows two further images, IM1-1 and IM2-1 part of a repeat of the sequence just to indicate that the sequence indicated by $T_{SEQ}$ is typically repeated, for example so that the whole object becomes 3D scanned by light triangulation and with multispectral 2D image data captured in connection with this and in relation to the 3D image data.

Note that embodiments herein, since there are two or more second lights and thus two or more IM2s in each sequence, can be implemented as a combination between the first and second main group of embodiments, although this is not shown in the figures. That is, in for example a sequence of two or more IM2s and associated one or more IM1s, one or more of the IM2s may be the same as one or more IM1s of the sequence, respectively, and one or more other IM2s of the sequence may be separate from and generated between IM1s. It would thus for example be possible with only one separate IM2 in a corresponding example as in FIG. 7B, say for example that IM2-1=IM1-1 with IM2-2 separate from and between IM1-1 and then a next further IM1-2 part of a repeat of the sequence.

FIGS. 8A-E schematically illustrates examples with different sequences of second lights. The examples are shown for embodiments corresponding to the first main example group, that is, with IM2s=IM1s, but based on the above it is realized that corresponding sequencies are applicable also for the other second main example group and for combinations between the two main example groups.

Figure 8A:
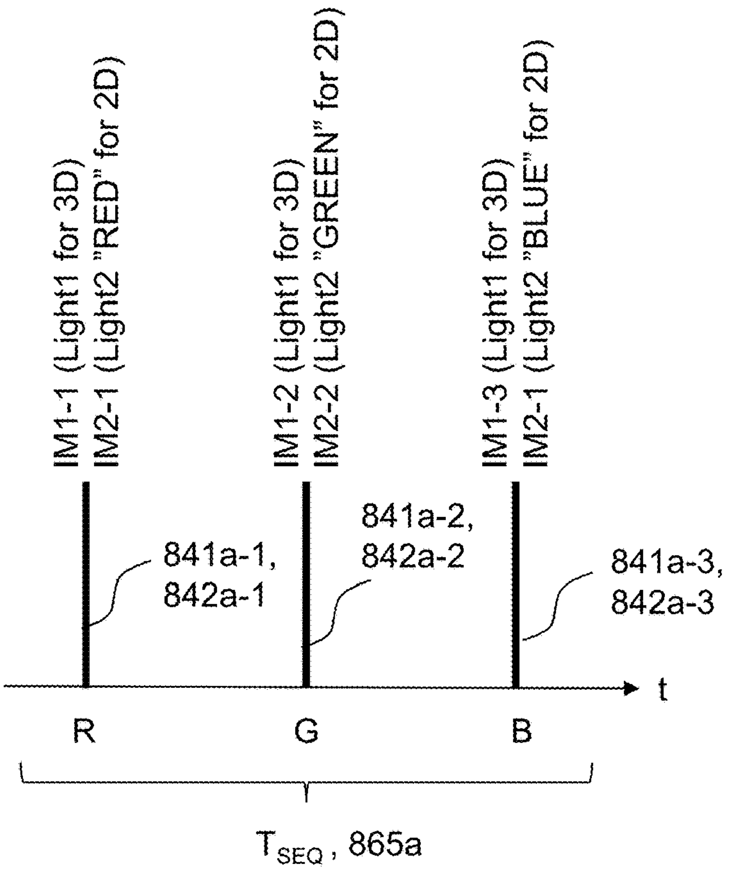
FIGS. 8A-E schematically illustrates examples with different sequences of second lights.

FIG. 8A is schematic example corresponding to the example in FIG. 7A but with three second lights R, G, B (Red, Green, Blue), such as mentioned above, and three IM2s=IM1s in sequence with a period $T_{SEQ}$ 865*a*. The sequence may thus be described as R, G, B. There is an IM2-1 842*a*-1 that is the same as a IM1-1 841*a*-1, an IM2-2 842*a*-2 that is the same as an IM1-2 841*a*-2 and an IM2-3 842*a*-3 that is the same as an IM1-3 841*a*-3. Hence: During exposure of the image sensor 531 resulting in generation of IM2-1, the second light illuminating of the object 520 is Red light. During the exposure of the image sensor 531 resulting in generation of IM2-2, the second light illuminating the object 520 is Green light. During the exposure of the image sensor 531 resulting in generation of IM2-3, the second light illuminating the object 520 is Blue light.

Figure 8B:
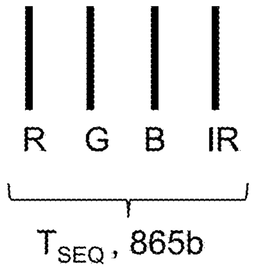

FIG. 8B is another schematic example of a sequence as discussed above but in a more comprehensive view, simply indicating the kind of second light for each image frame of the sequence. Hence, in this example the sequence is R, G, B, IR and hence four IM2s (and four IM1s since IM2=IM1 as stated above). The sequence is in the figure indicated by a sequence period $T_{SEQ}$ 865*b*

Figure 8C:
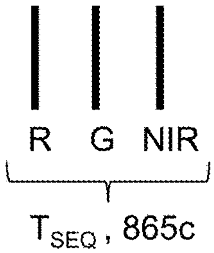

FIG. 8C is yet another schematic example of a sequence as discussed above and shown in the same type of comprehensive view as in FIG. 8B. Also here it is indicated the kind of second light for each image frame of the sequence. Hence, in this example the sequence is R, G, NIR and hence with three IM2s (and four IM1s since IM2=IM1 as stated above) in the sequence. The sequence is in the figure indicated by a sequence period $T_{SEQ}$ 865*c*.

Figure 8D:
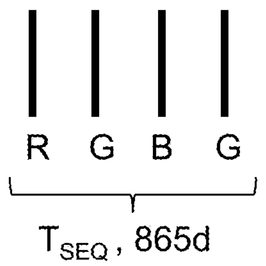

FIG. 8D is yet another schematic example of a sequence as discussed above and shown in a comprehensive view as in FIGS. 8B-C. Also here it is indicated the kind of second light for each image frame of the sequence. Hence, in this example the sequence is R, G, B, G, thus with green light occurring more frequently than red and blue, as mentioned above. Although there in this example are only three different second lights, the sequence contains four IM2s (and four IM1s since here IM2=IM1 as stated above). The sequence is in the figure indicated by a sequence period $T_{SEQ}$ 865*c*.

Figure 8E:
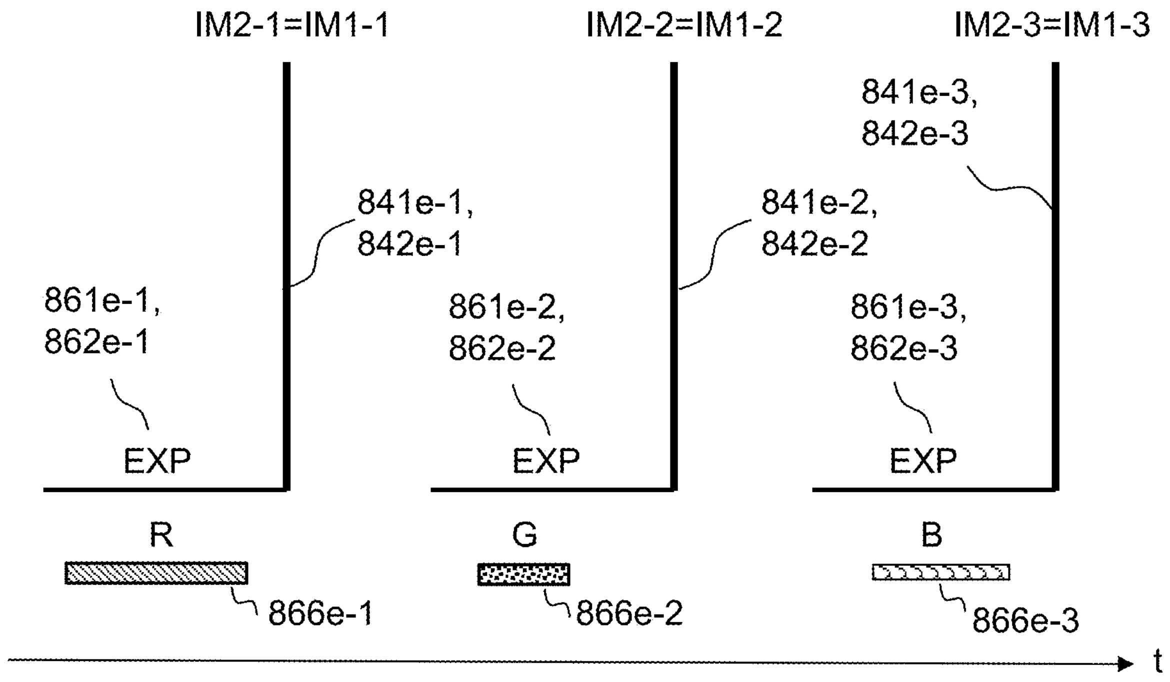

FIG. 8E corresponds to the example of FIG. 8A except for that respective second light's "on-time" that is, illumination duration, here differ per IM2. The on-duration (and thus also corresponding off duration) of respective second light during the exposure periods that results in the IM2s (and IM1s since IM2=IM1 in the example) thus differ in some embodiments, for example for white balancing purpose as mentioned above. In these embodiments the on/off duration of respective second light may be controlled, typically by the imaging system 500, for example by the computing device 533 thereof, so that suitable durations of second light illuminations are accomplished during the exposure periods. Hence, in FIG. 8A, there is shown:

- an IM2-1 842*e*-1 that is the same as a IM1-1 841*e*-1 with exposure period EXP,
- an IM2-2 842*e*-2 that is the same as a IM1-2 841*e*-2 with exposure period EXP, and
- an IM2-3 842*e*-3 that is the same as a IM1-3 841*e*-3 with exposure period EXP.

Note that the exposure periods EXP as shown in the example are typically, but not necessarily, the same for all images, at least for the first group with IM2s=IM1s.

During the exposure period EXP of the image sensor 541 resulting in generation of IM2-1 842*e*-1, the second light illuminating of the object 520 is Red light (R) during a red light on-period 866*e*-1 that may be less than EXP. During the exposure period EXP of the image sensor 541 resulting in generation of IM2-2 842*e*-2, the second light illuminating of the object 520 is Green light (G) during a green light on-period 866*e*-2 that may be less than EXP. During the exposure period EXP of the image sensor 541 resulting in generation of IM2-3 842*e*-3, the second light illuminating of the object 520 is Blue light (B) during a blue light on-period 866*e*-3 that may be less than EXP.

Note that in case of the second main example group with IM2s separate from IM1s, effective illumination by second lights can instead be accomplished by controlling the exposure periods EXP of IM2s and then respective second light can have the same on-duration covering the exposure periods. This may not be possible or at least be less suitable for the first main example group as in the example of FIG. 8E with IM2=IM1 since that would mean different exposure periods being used also for the first light and the light triangulation and hence different exposure to first light in different IM1s, which typically is not desirable. However, same exposure period of first light may also in that case be possible to accomplished by controlling the on/off duration of the first light so it is still "on" for one and the same time period during each exposure period.

The above is only an example, and the principle is of course applicable to any type of second lights of different wavelengths, not only RGB.

From what has been discussed above it can be understood that to provide the second lights it can be a matter of controlling which second light is switched on/off and for how long, and in what sequence during the imaging, for example by controlling an illumination unit and/or light source(s) that provide the second lights. In practice this may correspond to a "blinking" of the second lights with a different second light in each "blink" according to the sequence used and then the sequence may be repeated, for example as long as the scanning of the object continues. The first light, for example laser, may be switched on permanently during this time, and/or in accordance to the light triangulation that the system performs. Note that the light triangulation as such, at least in principle, need not be affected by the second lights. However, in some embodiments, the first light, for example laser, may be "blinked" as well, that is, switched off if/when the first light should not be present in one or more of the second images. Also, in some embodiments, there are several single second light sources and/or illumination units for providing illumination of second lights from several different directions, for example as disclosed in said earlier application. This way advantages similar and/or corresponding to the ones discussed in said earlier application by illumination from different directions and/or in different ways, can be obtained also with multispectral 2D image data associated with 3D image data as in embodiments herein. Also note that the second lights, for example in said single illumination unit, may provide the illumination in various ways, for example as disclosed in said earlier application regarding provision of second light (s).

FIGS. 9A-D show example images and results from a real and practical application of embodiments herein. The embodiments resulting in the images are based on said first main example group with IM2s=IM1s and the sequence of multispectral second lights is NIR, R, G, B, that is, four different second lights and thus, in line with the explanations above, a respective 2D image data resolution that is ¼ of the resolution of the 3D image data. The test object being imaged was formed from a piece of wood upon which differently colored pieces of candy were placed to form a composite test object for the imaging with many different colors, structures and materials. The object was 3D imaged by light triangulation, here via scanning through the first and second lights. The scan involved generation of over 5000 IM1s, thus first images, with SP1s in each, resulting in 3D profiles according to the light triangulation. About 5120 IM1s were used in the examples shown in the figures, thus corresponding to 5120 profile images of the object and thus a corresponding 3D image data resolution in the dimension corresponding to the scan direction, in the examples in a y'-direction.

Figure 9A:
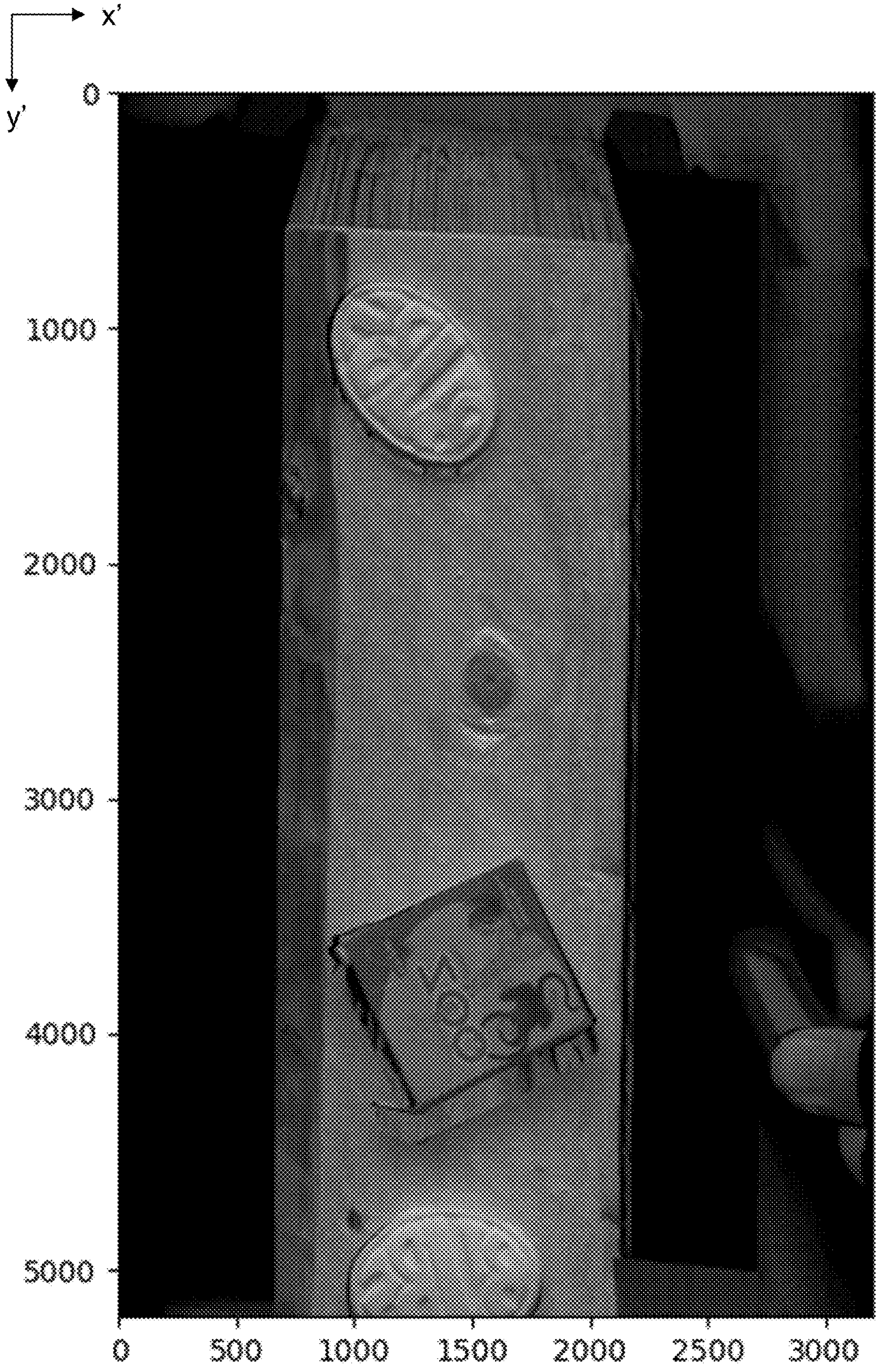
FIGS. 9A-D show example images and results from a real and practical application of embodiments herein.

FIG. 9A shows a combined image of the 3D image data in the form of 3D image points, corresponding to pixels in 3D, thus voxels, with associated multispectral 2D image data according to embodiments herein. Because true 3D cannot be shown here, what is shown is a 2D view of the 3D image points "from above" so that the object is shown in a x'-y' plane. The associated 2D image data is clearly visible as a texture on the object formed by the 3D image points.

Figure 9B:
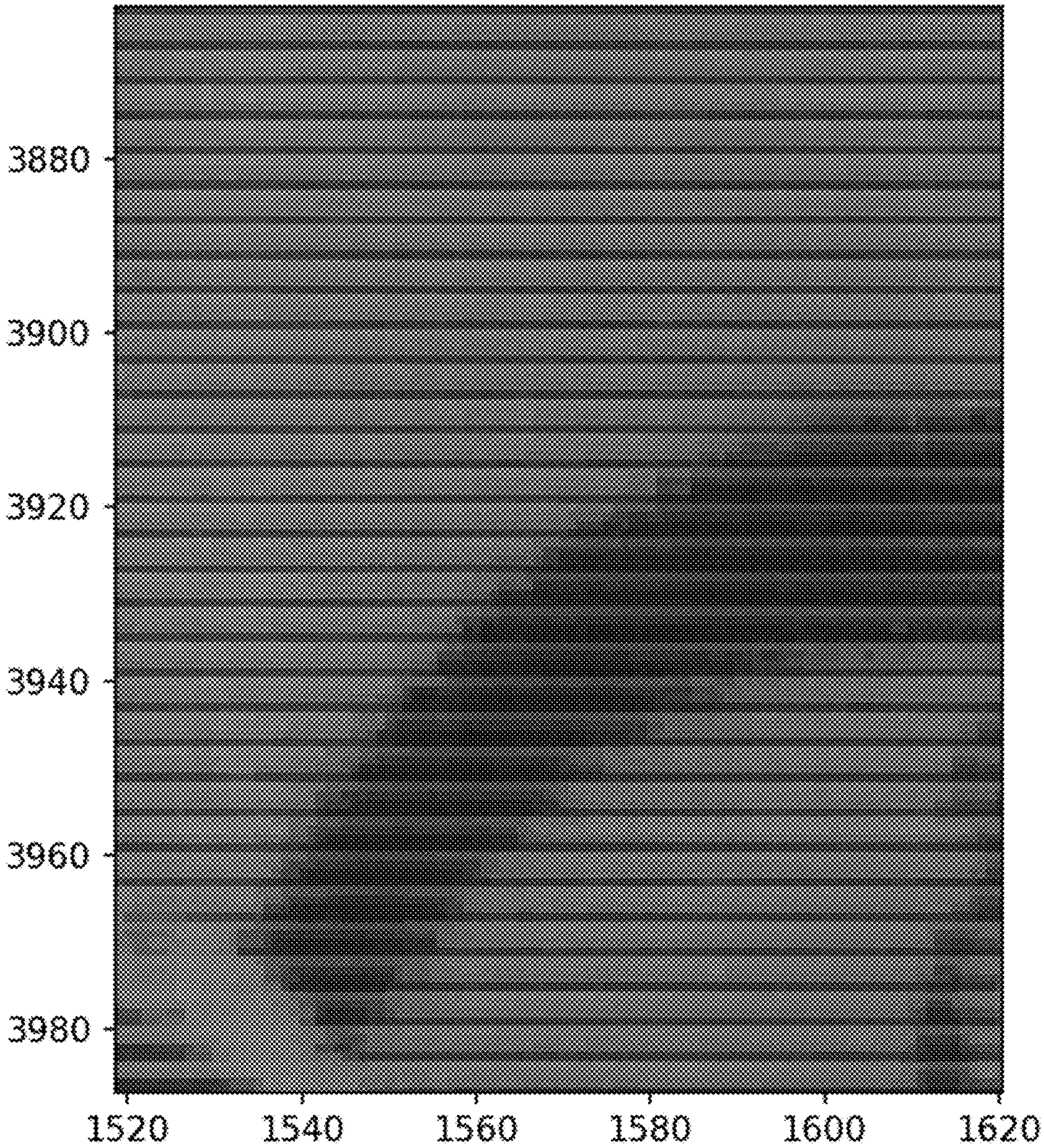

FIG. 9B is a magnification of a part of the image shown in FIG. 9A where it can be seen that there is different 2D image data for every fourth line of 3D image data, that is, for every fourth line of 3D image points, in the y'-direction. Thus as expected according to the sequence used with 4 IM2s and 4 different second lights, respectively. Hence, the 2D image data resolution is ¼ of the 3D image data resolution in the y' direction, thus 5120/4=1280.

Figure 9C:
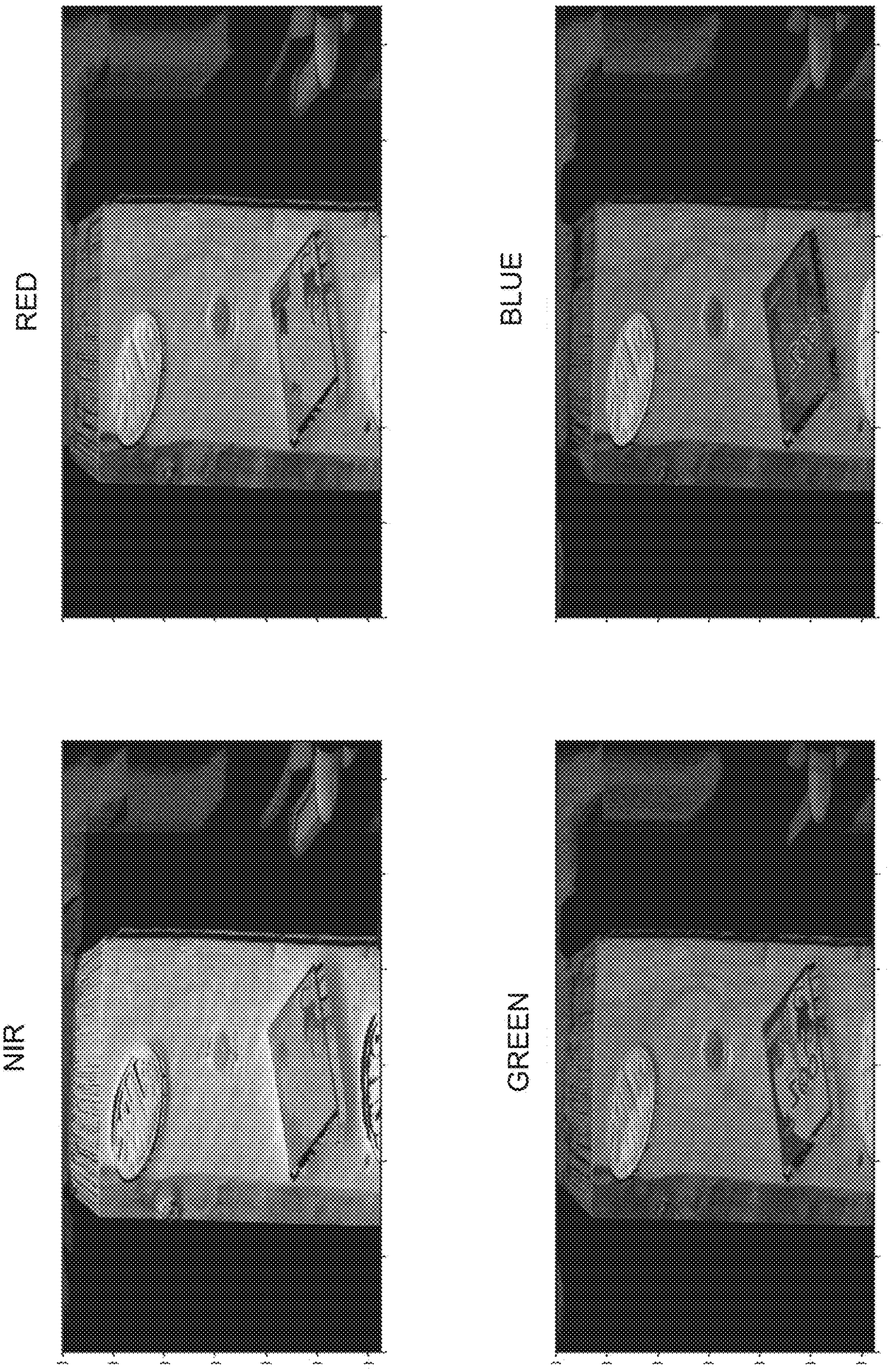

FIG. 9C shows the 2D image data separated into 4 images, each with a resolution of 1280 in the y' direction. It can clearly be seen that respective image shown, through illumination of respective second light, has captured different 2D information about the object. As explained above, the 2D image data of each image comprise intensity values as a result from sensed reflected second light from the object with the second light illuminating the object during the exposure resulting in the IM2s that the 2D image data were obtained from (from the SP2 positions). Respective 2D image data may thus be view as a monochrome, for example grey scale, image, but if each one is represented by separate monochrome colors, for example R G B and some suitable colors scale for NIR, it is realized a full color image with mix of all colors can be accomplished. Of course it is also possible and sometimes sufficient and/o desirable to use and/or view the 2D image data in separation and not mixed or combined with each other. For example to view 2D image data associated with 3D image data in separate images, for example side by side for comparison, as in FIG. 9C. In other cases measurement may be performed on the 2D image data associated with the 3D image data without actual need to view the 2D image data.

In any case, it may be realized that it is often desirable to have all image data in one and the same resolution. This way line effects and related distortions, such as seen in FIG. 9B, can be avoided. Hence, as already mentioned above, respective 2D image data may be provided as, for example converted into, one and the same resolution. With the 2D image data being at lower resolution, it may be suitable to convert the 2D image data, for example in the form of an image as in FIG. 9C, to the same resolution as the 3D image data. The conversion may be performed by re-sampling, thus up-sampling in the example.

Figure 9D:
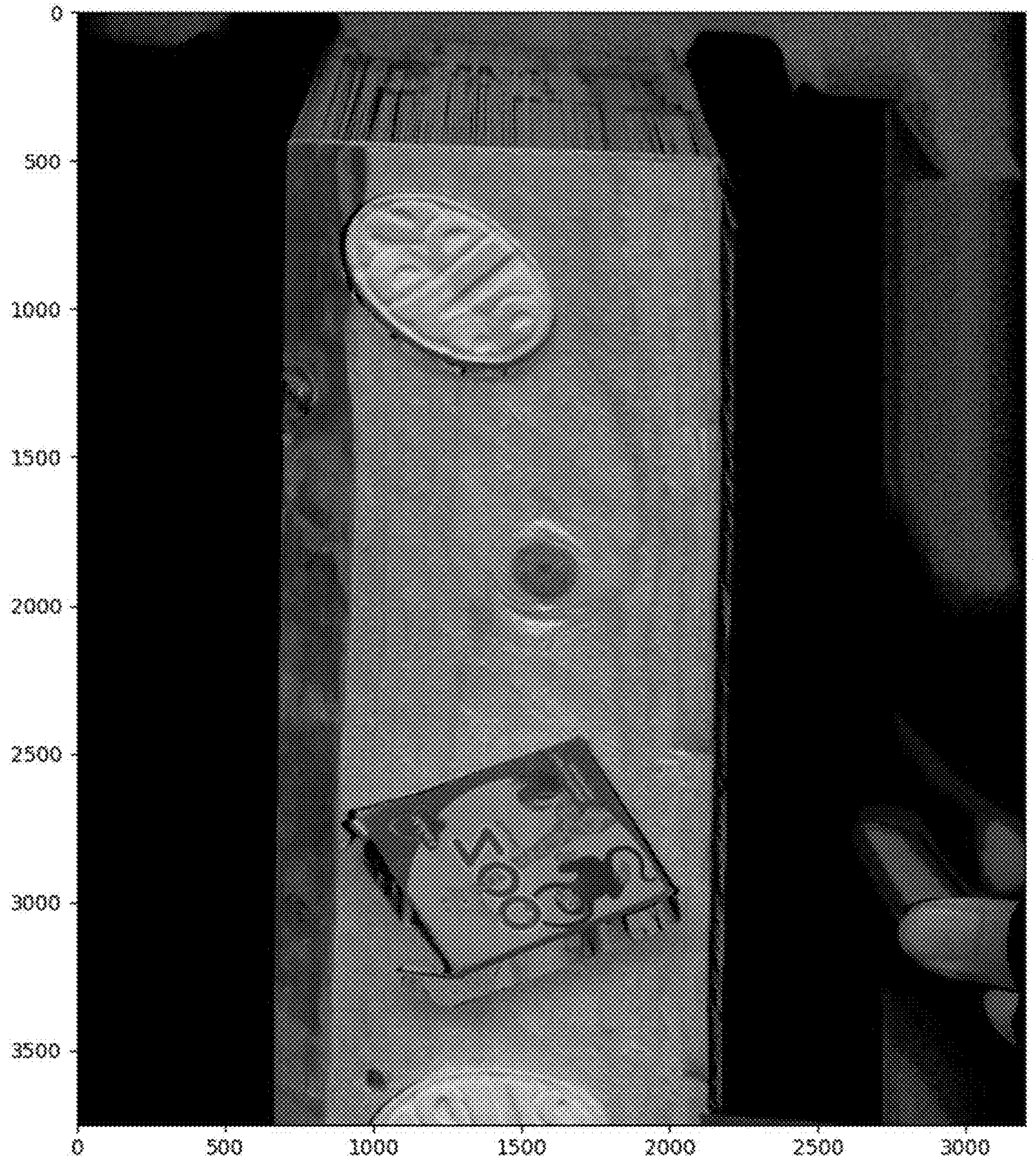

FIG. 9D shows a combined image with 3D data and 2D image data after the latter first have been up-sampled to the same resolution as the 3D image data. As a result there will be multispectral 2D image data represented by 4 intensity values per 3D image data point, and one intensity value per second light used. Hence a full color image and texture on the object in 3D can be accomplished, as shown in FIG. 9D. Note that the image is in color but since patent drawings and figures are typically reproduced in black and white and/or grey scale, the image of FIG. 9D may nevertheless appear in gray scale in the drawings.

Figure 10:
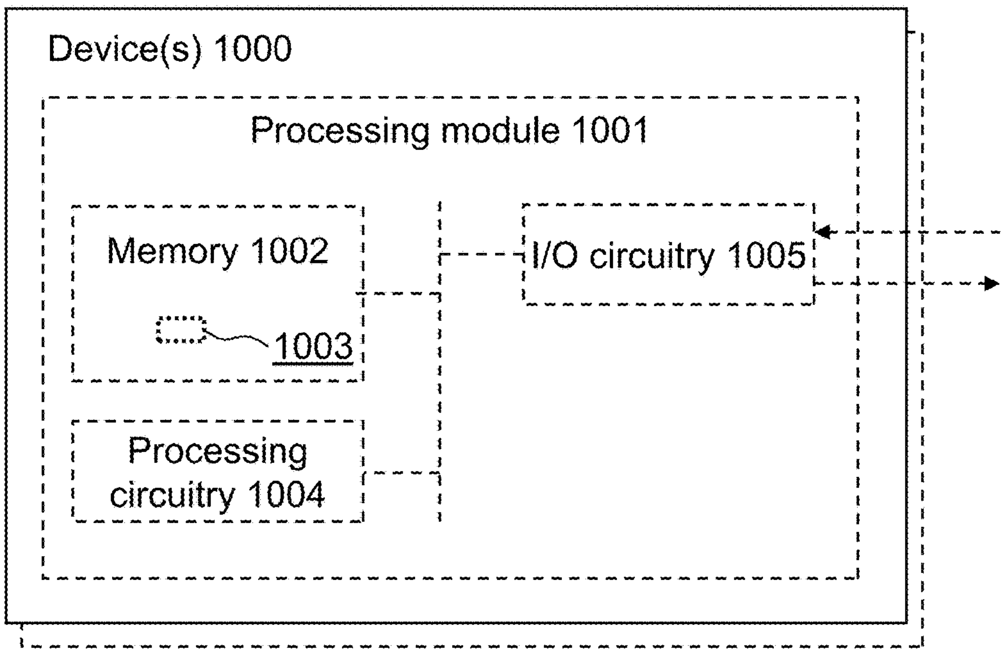
FIG. 10 is a schematic block diagram for illustrating embodiments of device(s) for performing embodiments herein.

FIG. 10 is a schematic block diagram for illustrating embodiments of one or more devices 1000, i.e. device(s) 1000, that may correspond to devices(s) already mentioned in the above for performing embodiments herein, such as for performing the method and/or actions described above in relation to FIG. 6. The device(s) 1000 may e.g. correspond to the computing device 533 and/or the camera 530, or suitable devices comprised in and/or forming the imaging system 500, or one or more computing devices remote and separate from the involved imaging system. For example computing device(s) operating on output from the imaging system 500. Hence, device(s) 1000 performing the method may do so at some later occasion than when the imaging system 500 was operated and provided the IM1s, IM2s etc. Hence, the method may be performed by device(s) that are remote in time and space from the imaging system and the imaging as such. Output from an imaging system as required by the method may for example be uploaded to a server or computer cloud comprising computing device(s) configured to perform the method. However, it is typically preferred with a device configured to perform the method as part of and/or in connection with the involved imaging system and the imaging since this enables faster execution and that less image data has to be temporarily stored and/or transferred longer distances. Hence, it may be preferred that the device (s) 1000 is/are the camera 533 and/or computing deice 533, or in other words that the camera 530 and/or computing device 533 are configured to carry out the method.

The schematic block diagram is for illustrating embodiments regarding how the device(s) 1000 may be configured to perform the method and actions discussed above in relation to FIG. 6. Hence, the device(s) 1000 is for associating multispectral 2D image data with 3D image data generated from light triangulation performed by an imaging system, such as the imaging system 500, for 3D imaging of an object.

The device(s) 1000 may comprise a processing module 1001, such as processing means, one or more hardware modules, including e.g. one or more processing circuits, circuitry, such as processors, and/or one or more software modules for performing said method and/or actions.

The device(s) 1000 may further comprise memory 1002 that may comprise, such as contain or store, computer program(s) 1003. The computer program(s) 1003 comprises 'instructions' or 'code' directly or indirectly executable by the device(s) 900, respectively, to perform said method and/or actions. The memory 1002 may comprise one or more memory units and may further be arranged to store data, such as configurations, data and/or values, involved in or for performing functions and actions of embodiments herein.

Moreover, respective device 1000 may comprise processing circuitry 1004 involved in processing and e.g. encoding data, as exemplifying hardware module(s) and may comprise or correspond to one or more processors or processing circuits. The processing module(s) 1001 may comprise, e.g. 'be embodied in the form of' or 'realized by' such processing circuitry 1004. In these embodiments, the memory 1002 may comprise the computer program(s) 1003 respectively executable by processing circuitry 904, whereby respective device(s) 1000 is operative, or configured, to perform said method and/or actions thereof.

Typically the device(s) 1000, e.g. the processing module (s) 1001, comprises an Input/Output (I/O) module(s) 1005, configured to be involved in, e.g. by performing, any communication to and/or from other units and/or devices, such as sending and/or receiving information to and/or from other devices. The I/O module(s) 1005 may be exemplified by obtaining, e.g. receiving, module(s) and/or providing, e.g. sending, module(s), when applicable.

Further, in some embodiments, the device(s) 1000, e.g. the processing module(s) 901, comprises one or more of selecting module(s), associating module(s), selecting module(s), combining module(s), as exemplifying hardware and/or software module(s) for carrying out actions of embodiments herein. These modules may be fully or partly implemented by processing circuitry 1004.

Hence:

The device(s) 1000, and/or the processing module(s) 1001, and/or processing circuitry 1004, and/or the I/O module(s) 1005, and/or the obtaining module(s), is/are operative, or configured, to, obtain said 3D data as said SP1s of the IM1s generated by said camera and image sensor.

The device(s) 1000, and/or the processing module(s) 1001, and/or the processing circuitry 1004, and/or the I/O module(s) 1005, and/or the obtaining module(s), is/are operative, or configured, to, obtain said two or more IM2s generated by said camera and image sensor and imaging the object during illumination by said two or more second lights, respectively, wherein respective IM2 is either, and associated with, a respective IM1 of said IM1s, or generated between two of said IM1s and associated with any of them.

The device(s) 1000, and/or the processing module(s) 1001, and/or the processing circuitry 1004, and/or the I/O module(s) 1005, and/or the selecting module(s), is/are operative, or configured, to, select in respective IM2, for and in relation to the respective SP1 of the respective IM1 that the respective IM2 is associated with, said respective SP2 where reflected second light from the object has higher intensity than the reflected first light from the object.

The device(s) 1000, and/or the processing module(s) 1001, and/or the processing circuitry 1004, and/or the I/O module(s) 1005, and/or the associating module(s), is/are operative, or configured, to, associate the intensity values of the selected SP2s with the SP1s they were selected for, respectively, so that said multispectral 2D data corresponding to the intensity values in the SP2s from the reflected multispectral second lights become associated with the 3D data corresponding to the SP1s that the SP2s were selected for.

The device(s) 1000, and/or the processing module(s) 1001, and/or the processing circuitry 1004, and/or the I/O module(s) 1005, and/or the providing module(s), may be operative, or configured, to, provide the 3D image data and 2D image data in the same resolution.

The device(s) 1000, and/or the processing module(s) 1001, and/or the processing circuitry 1004, and/or the I/O module(s) 1005, and/or the combining module(s), may be operative, or configured, to, combine the 3D image data and the 2D image in the same resolution into said combined image, so that respective 3D image data point of the image becomes associated with multispectral 2D image data corresponding to intensity values resulting from the reflected said two or more second lights comprising different wavelengths.

Figure 11:
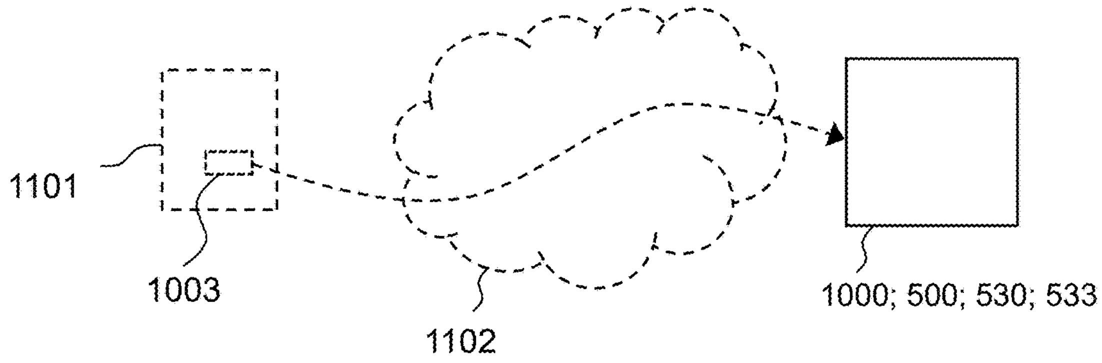
FIG. 11 is a schematic drawing illustrating some embodiments relating to computer program(s) and carrier(s) thereof to cause device(s) to perform the method and actions discussed in relation to FIG. 6.

FIG. 11 is a schematic drawing illustrating some embodiments relating to the computer program(s) 1003 and carriers thereof to cause said device(s) 1000 discussed above to perform said method and actions.

The computer program(s) 1003 comprises instructions that when executed by processing circuitry 1004 and/or the processing module(s) 1001, cause the device(s) 1000 to perform as described above. In some embodiments there is provided one or more carriers, that is carrier(s), or more specifically data carrier(s), such as computer program product(s), comprising the computer program(s). Respective carrier(s) may be one of an electronic signal, an optical signal, a radio signal, and a computer readable storage medium, e.g. a computer readable storage medium 1101 as schematically illustrated in the figure. The computer program(s) 1003 may thus be stored on the computer readable storage medium 1101. By carrier may be excluded a transitory, propagating signal and the data carrier may correspondingly be named non-transitory data carrier. Non-limiting examples of the data carrier being a computer readable storage medium is a memory card or a memory stick, a disc storage medium or a mass storage device that typically is based on hard drive(s) or Solid State Drive(s) (SSD). The computer readable storage medium 1101 may be used for storing data accessible over a computer network 1102, e.g. the Internet or a Local Area Network (LAN). The computer program(s) 1003 may furthermore be provided as pure computer program(s) or comprised in a file or files. The file or files may be stored on computer readable storage medium 1001 and for example be available through download, for example over the computer network 1102 as indicated in the figure, such as via a server. The server may be a web or File Transfer Protocol (FTP) server, or similar. The file or files may be executable files for direct or indirect download to and execution on said device(s) to make it perform as described above, e.g. by execution by processing circuitry 1004. The file or files may also or alternatively be for intermediate download and compilation involving the same or another processor(s) to make them executable before further download and execution causing said device(s) 1000 to perform as described above.

Note that any processing module(s) and circuit(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the device(s), sensor(s) etc. to be configured to and/or to perform the above-described methods and actions.

Identification by any identifier herein may be implicit or explicit. The identification may be unique in a certain context, e.g. for a certain computer program or program provider.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first device, second device, first surface, second surface, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. A method for associating multispectral 2D image data with 3D image data generated from light triangulation performed by an imaging system (500) for 3D imaging of an object (520), wherein the imaging system (500) comprises a first light source (510) for illuminating the object (520) with first light (511), a camera (530) with image sensor (531) and one or more second light sources (550) for illuminating the object (520) with two or more second lights (551) that are multispectral by differing from each other by comprising different light wavelengths, wherein the light triangulation comprises to illuminate different consecutive portions of the object (520) with the first light (511) and sense reflected first light from respective portion by the image sensor (531) in a respective first image, "IM1", (541), wherein the method comprises:

obtaining (601) said 3D data as first sensor positions, "SP1s", (571) of IMIs (541) generated by said camera (530) and image sensor (531), the SP1s corresponding to locations of intensity peaks of reflected first light from the object (520) as part of said light triangulation, obtaining (602) two or more second images, "IM2s", (742) generated by said camera (530) and image sensor (531), imaging the object during illumination by said two or more second lights (551), respectively, wherein respective IM2 is either, and associated with, a respective IM1 of said IM1s (741), or generated between two of said IM1s (741) and associated with any of them, selecting (603) in respective IM2 (542), for and in relation to respective SP1 (571) of the respective IM1 (541) that the respective IM2 (542) is associated with, a respective second sensor position, "SP2", (572) where reflected second light (551) from the object (520) has higher intensity than the reflected first light from the object (520), and associating (604) intensity values of the selected SP2s (572) with the SP1s (571) they were selected for, respectively, whereby multispectral 2D data corresponding to the intensity values in the SP2s (572) from the reflected multispectral second lights (551) become associated with the 3D data corresponding to the SP1s (571) that the SP2s (571) were selected for.

2. The method as claimed in claim 1, wherein the method further comprises:

providing (605) the 3D image data and 2D image data in same resolution and combining (606) the 3D image data and the 2D image in the same resolution into a combined image, whereby a respective 3D image data point of the image becomes associated with multispectral 2D image data corresponding to intensity values resulting from the reflected said two or more second lights comprising different wavelengths.

3. The method as claimed in claim 2, wherein, if resolution of the 3D image data and the 2D image data differ, said provision in same resolution is accomplished by up- and/or down-resampling of the 3D image data and/or the 2D image data.

4. The method as claimed in claim 1, wherein said the second lights comprise one or more of: Red light, "R", Green light, "G", and Blue light, "B".

5. The method as claimed in claim 4, wherein the second lights comprise R, G, B and wherein differences in illumination duration by R, G, B is used during the imaging for white balancing.

6. The method as claimed in claim 1, wherein the second lights comprises second lights corresponding to Infrared, "IR", light or Near Infrared, "NIR", light.

7. The method as claimed in claim 1, wherein the illumination by said two or more second lights is provided sequentially according to a sequence of said two or more second lights with said second images generated in a corresponding sequence.

8. The method as claimed in claim 7, wherein one or more of said second lights are occurring more frequently than one or more other of said second lights in said sequence.

9. The method as claimed in claim 8, wherein the sequence of second lights comprise Red light, "R", Green light, "G", and Blue light, "B", and wherein G is occurring more often than R and B in the sequence.

10. The method as claimed in claim 1, wherein the object is organic.

11. The method as claimed in claim 10, wherein the object is or correspond to one of the following type and/or kind of objects: plant, tree, log, wood, meat, vegetable, food, waste.

12. A device for associating multispectral 2D image data with 3D image data, said 3D image data being generated from light triangulation performed by an imaging system (500) for 3D imaging of an object (520), wherein the imaging system (500) comprises a first light source (510) for illuminating the measure object (520) with first light (511), a camera (530) with n image sensor (531) and one or more second light source (550) for illuminating the object (520) with two or more second lights (551) that are multispectral by differing from each other by comprising different light wavelengths (231) for sensing reflected first light (413; 513) from the measure object (220; 520), wherein the light triangulation comprises to illuminate first different consecutive portions of the measure object (520) with the first light (511) and sense reflected first light from respective portion the first portion by the image sensor (531) in a respective first image, "IM1", (541), wherein said device is configured to:

obtain said 3D data as first sensor positions, "SP1s", (571) of IM1s (541) generated by said camera (530) and image sensor (531), the SP1s corresponding to locations of intensity peaks of reflected first light from the object (520) as part of said light triangulation, obtain two or more second images, "IM2s", (742) generated by said camera (530) and image sensor (531), imaging the object during illumination by said two or more second lights (551), respectively, wherein respective IM2 is either, and associated with, a respective IM1 of said IM1s (741), or generated between two of said IMIs (741) and associated with any of them, select (603) in respective IM2 (542), for and in relation to respective SP1 (571) of the respective IM1 (541) that the respective IM2 (542) is associated with, a respective second sensor position, "SP2", (572) where reflected second light (551) from the object (520) has higher intensity than the reflected first light from the object (520), and associate (604) intensity values of the selected SP2s (572) with the SP1s (571) they were selected for, respectively, whereby multispectral 2D data corresponding to the intensity values in the SP2s (572) from the reflected multispectral second lights (551) become associated with the 3D data corresponding to the SP1s (571) that the SP2s (571) were selected for.

13. A computer program (1003) comprising non-transitory instructions that when executed by one or more processors (1004) causes said device according to claim 12 to perform the method according to claim 1.

* * * * *